US007676786B2

(12) United States Patent
Shenfield et al.

(10) Patent No.: US 7,676,786 B2
(45) Date of Patent: Mar. 9, 2010

(54) SYSTEM AND METHOD AND APPARATUS FOR USING UML TOOLS FOR DEFINING WEB SERVICE BOUND COMPONENT APPLICATIONS

(75) Inventors: Michael Shenfield, Richmond Hill (CA); Rob Kline, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 1072 days.

(21) Appl. No.: 11/345,332

(22) Filed: Feb. 2, 2006

(65) Prior Publication Data
US 2007/0198968 A1 Aug. 23, 2007

(51) Int. Cl.
*G06F 9/44* (2006.01)
(52) U.S. Cl. ........................................ 717/104
(58) Field of Classification Search .................. 717/104, 717/106, 107
See application file for complete search history.

(56) References Cited

U.S. PATENT DOCUMENTS

| 7,243,344 | B2 * | 7/2007 | Snover et al. | 717/143 |
|---|---|---|---|---|
| 7,409,674 | B2 * | 8/2008 | Shenfield et al. | 717/114 |
| 7,464,366 | B2 * | 12/2008 | Shukla et al. | 717/100 |
| 7,503,038 | B2 * | 3/2009 | Pandit et al. | 717/126 |
| 2002/0091990 | A1 * | 7/2002 | Little et al. | 717/105 |

(Continued)

FOREIGN PATENT DOCUMENTS

EP 1460534 9/2004

(Continued)

OTHER PUBLICATIONS

Maurer et al., Merging Project Planning and Web-Enabled Dynamic Workflow Technologies, May 2000, IEEE Internet Computing, p. 65-74.*

(Continued)

*Primary Examiner*—Wei Y Zhen
*Assistant Examiner*—Yuntao Guo
(74) *Attorney, Agent, or Firm*—Xiang Lu; Mark Sprigings; Gowling Lafleur Henderson LLP

(57) ABSTRACT

A system and method is provided for generating a software application including a plurality of components, a first set of the components having metadata descriptors expressed in a structured definition language for defining configuration information of the software application and a second set of the components being expressed as a series of scripted instructions coupled to the metadata descriptors for defining a workflow of the software application. The software application is used for facilitating interaction with a schema-defined service by a terminal device over a network. The system and method comprise a workflow extractor for identifying a workflow sequence generated by a modeling tool in an output of the modeling tool. The workflow sequence is associated with at least one of a flow diagram or a relational diagram of the modeling tool for describing interactions between a pair of components of the first set of components. The system and method also include a workflow generator for generating a workflow mechanism based on the identified workflow sequence, the workflow mechanism for associating processing of the metadata descriptors of one component of the pair of components with the other component of the pair of components during execution of the software application. The workflow mechanism can be a component mapping expressed in the metadata descriptors of the first set of components or expressed as the series of scripted instructions.

17 Claims, 12 Drawing Sheets

U.S. PATENT DOCUMENTS

| | | | |
|---|---|---|---|
| 2002/0143913 A1 | 10/2002 | Sahita et al. | |
| 2004/0078373 A1* | 4/2004 | Ghoneimy et al. | 707/10 |
| 2004/0237066 A1* | 11/2004 | Grundy et al. | 717/104 |
| 2005/0108727 A1* | 5/2005 | Bernstein et al. | 719/320 |
| 2005/0125771 A1* | 6/2005 | Vitanov et al. | 717/104 |
| 2005/0193370 A1* | 9/2005 | Goring et al. | 717/115 |
| 2005/0278386 A1* | 12/2005 | Kelly et al. | 707/200 |
| 2006/0031817 A1* | 2/2006 | Pieper | 717/107 |
| 2006/0200799 A1* | 9/2006 | Wills et al. | 717/109 |
| 2006/0235731 A1* | 10/2006 | Gupta et al. | 705/4 |
| 2006/0253849 A1* | 11/2006 | Avram et al. | 717/172 |
| 2007/0055972 A1* | 3/2007 | Brown et al. | 717/174 |
| 2007/0061776 A1* | 3/2007 | Ryan et al. | 717/105 |
| 2007/0067766 A1* | 3/2007 | Tal et al. | 717/168 |
| 2007/0094638 A1* | 4/2007 | DeAngelis et al. | 717/107 |
| 2007/0143739 A1* | 6/2007 | Taber | 717/114 |
| 2007/0168932 A1* | 7/2007 | Seeger et al. | 717/105 |
| 2007/0180424 A1* | 8/2007 | Kazakov et al. | 717/104 |
| 2008/0216147 A1* | 9/2008 | Duffy | 726/1 |
| 2009/0031284 A1* | 1/2009 | Shenfield et al. | 717/114 |

FOREIGN PATENT DOCUMENTS

| | | |
|---|---|---|
| EP | 1569109 | 8/2005 |
| WO | WO2005/114489 | 12/2005 |

OTHER PUBLICATIONS

European Search Report for European Application No. EP06101234, Feb. 6, 2006, 9 pages, European Patent Office.

* cited by examiner

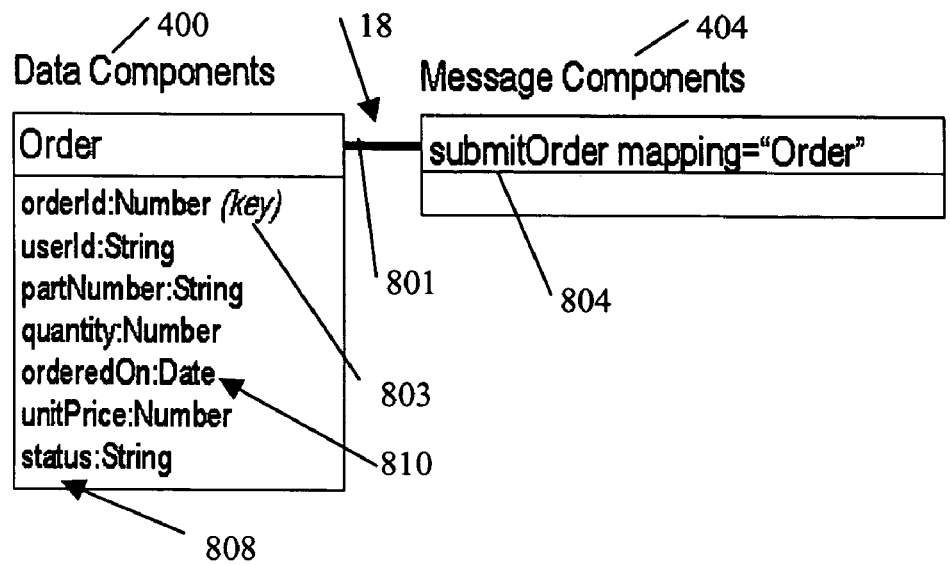

Figure 7a

```
400                                          803
  \                                         /
<wcData name="Order" pkey="orderId">
    <dfield name="orderId" type="Number"/>
812 <dfield name="userId" type="String"/>
    <dfield name="specialName" type="String"/>
    <dfield name="confirmationId" type="Number"/>
    <dfield name="deliveryTime" type="Date"/>
    <dfield name="status" type="String"/>
</wcData>
<wcMsg name="submitOrder" mapping="Order"/>
     \
      404
```

Figure 7b

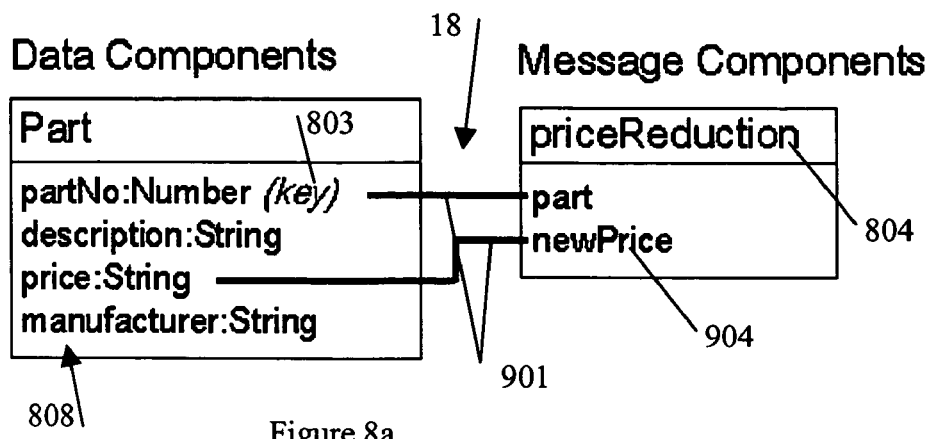

Figure 8a

```
                      400                    803
<wcData name="Part" pkey="partNo">
808   <dfield name="partNo" type="Number"/>
      <dfield name="description" type="String"/>
      <dfield name="price" type="String"/>
      <dfield name="manufacturer" type="String"/>
</wcData>
                                              901
<wcMsg name="priceReduction">
   <dfield name="part" mapping="Part.partNo"/>
   <dfield name="newPrice" mapping="Part.price"/>
</wcMsg>
         904                                   901
   404
```

Figure 8b

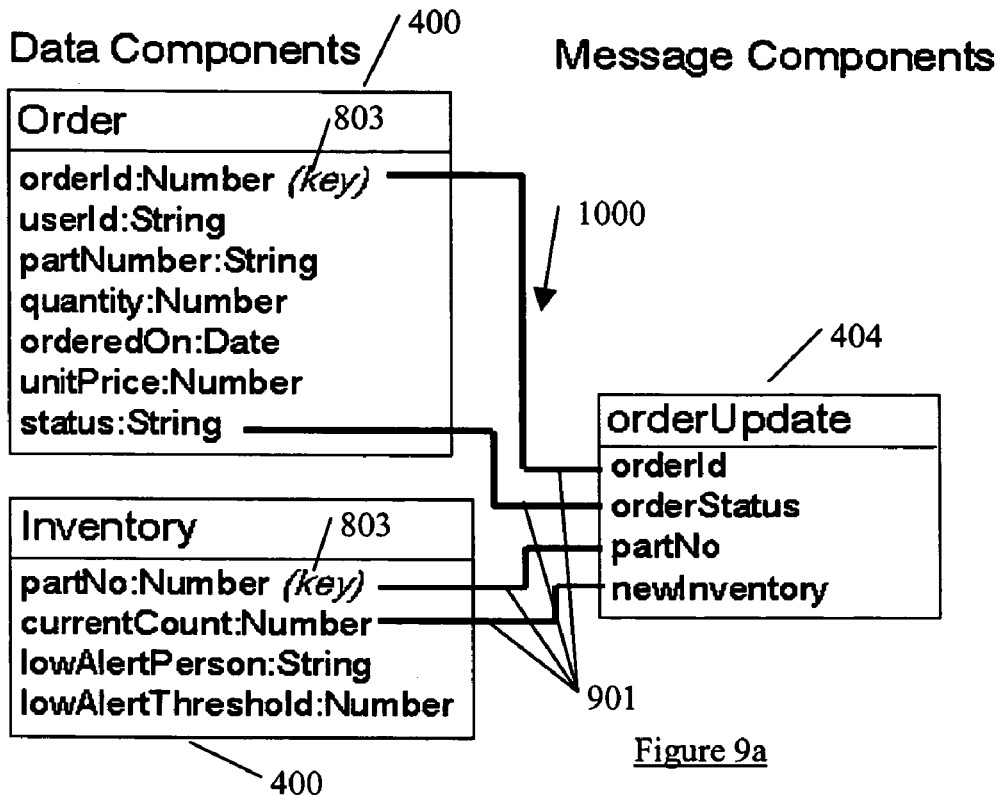

Figure 9a

```
                                                    803
<wcData name="Order" pkey="orderId">
   <dfield name="orderId" type="Number"/>
   <dfield name="userId" type="String"/>
   <dfield name="specialName" type="String"/>
   <dfield name="confirmationId" type="Number"/>
   <dfield name="deliveryTime" type="Date"/>
   <dfield name="status" type="String"/>
</wcData>
<wcData name="Inventory" pkey="partNo">     803
   <dfield name="partNo" type="Number"/>
   <dfield name="currentCount" type="Number"/>
   <dfield name="lowAlertPerson" type="String"/>
   <dfield name="lowAlertThreshold" type="Number"/>
</wcData>
<wcMsg name="orderUpdate">                                901
   <dfield name="orderId" mapping="Order.orderId"/>
   <dfield name="orderStatus" mapping="Order.status"/>
   <dfield name="partNo" mapping="Inventory.partNo"/>
   <dfield name="newInventory" mapping="Inventory.currentCount"/>
</wcMsg>
```

Figure 9b

SYSTEM AND METHOD AND APPARATUS FOR USING UML TOOLS FOR DEFINING WEB SERVICE BOUND COMPONENT APPLICATIONS

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

This application relates generally to the development of component-based applications.

BACKGROUND OF THE INVENTION

There is a continually increasing number of terminals and mobile devices in use today, such as smart phones, PDAs with wireless communication capabilities, personal computers, self service kiosks and two-way pagers/communication devices. Software applications which run on these devices increase their utility. For example, a smart phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task. These software applications can be used to facilitate the interaction with a variety of back-end data sources (such as Web services) and respective runtime environments of networked devices and terminals.

Currently, mobile communication devices are configured to communicate with Web Services through Internet-based Browsers and/or native applications, using modeling tools such as UML tools to assist in workflow expression in software application development. Undesirably, application developers need to have experience with programming languages such as Java and C++ to construct these hard-coded native applications. Further, there is an undesirable need to implement maintenance operations pertaining to compiled applications, including version, update, and platform type maintenance. There is a need for application development environments that can facilitate the interfacing of workflow expressed through modeling tools with the description of data source interfaces, such as Web Services Description Language (WSDL).

Systems and methods disclosed herein provide a component-based application development environment to obviate or mitigate at least some of the above presented disadvantages.

BRIEF DESCRIPTION OF THE DRAWINGS

Exemplary embodiments of the invention will now be described in conjunction with the following drawings, by way of example only, in which:

FIGS. 7*a* and 7*b* show an example embodiment of the mappings of FIG. 6;

FIGS. 8*a* and 8*b* show a further example embodiment of the mappings of FIG. 6;

FIGS. 9*a* and 9*b* show a further example embodiment of the mappings of FIG. 6;

DETAILED DESCRIPTION OF THE PREFERRED EMBODIMENTS

Figure 1:
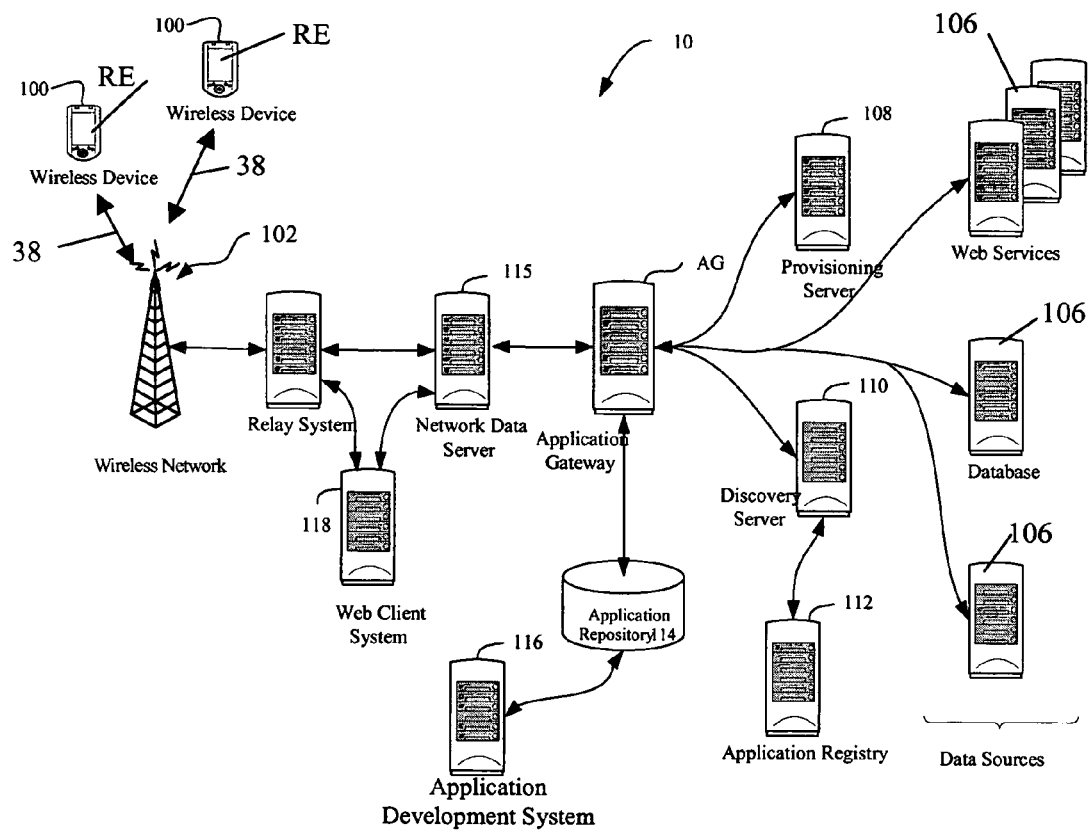
FIG. 1 is a block diagram of an example communication network.

Currently, mobile communication devices are configured to communicate with Web Services through Internet-based Browsers and/or native applications, using modeling tools such as UML tools to assist in workflow expression in software application development. Further, application developers need experience with programming languages such as Java and C++ to construct these hard coded native applications, as well as the need for compiled application version, update, and platform type maintenance. There is a need for application development environments that can facilitate the interfacing of workflow expressed through modeling tools with the description of data source interfaces (e.g. WSDL). Contrary to current application generation environments, a system and method is described below for generating a software application including a plurality of components, a first set of the components having metadata descriptors expressed in a structured definition language for defining configuration information of the software application and a second set of the components being expressed as a series of scripted instructions coupled to the metadata descriptors for defining a workflow of the software application. The software application is configured for facilitating interaction with a schema-defined service by a terminal device over a network. The system and method comprise a workflow extractor for identifying a workflow sequence generated by a modeling tool in an output of the modeling tool. The workflow sequence is associated with at least one of a flow diagram and a relational diagram of the modeling tool for describing interactions between a pair of components of the first set of components. The system and method also include a workflow generator for generating a workflow mechanism based on the identified workflow sequence, the workflow mechanism configured for associating a processing of the metadata descriptors of one component of the pair of components with the other component of the pair of components during execution of the software application. The workflow mechanism can be a component mapping expressed in the metadata descriptors of the first set of components or expressed as the series of scripted instructions.

One aspect provided is a system for generating a software application including a plurality of components, a first set of the components having metadata descriptors expressed in a structured definition language for defining configuration information of the software application and a second set of the components being expressed as a series of scripted instructions coupled to the metadata descriptors for defining a workflow of the software application, the software application for facilitating interaction with a schema-defined service by a terminal device over a network, the system comprising: a workflow extractor for identifying a workflow sequence generated by a modeling tool in an output of the modeling tool, the workflow sequence associated with at least one of a flow diagram and a relational diagram of the modeling tool for describing interactions between a pair of components of the first set of components; and a workflow generator for generating a workflow mechanism based on the identified workflow sequence, the workflow mechanism configured for associating a processing of the metadata descriptors of one component of the pair of components with the other component of the pair of components during execution of the software application.

A second aspect provided is a method for generating a software application including a plurality of components, a first set of the components having metadata descriptors expressed in a structured definition language for defining configuration information of the software application and a second set of the components being expressed as a series of scripted instructions coupled to the metadata descriptors for defining a workflow of the software application, the software application for facilitating interaction with a schema-defined service by a terminal device over a network, the method comprising the steps of: identifying a workflow sequence generated by a modeling tool in an output of the modeling tool, the workflow sequence associated with at least one of a flow diagram and a relational diagram of the modeling tool for describing interactions between a pair of components of the first set of components; and generating a workflow mechanism based on the identified workflow sequence, the workflow mechanism configured for associating a processing of the metadata descriptors of one component of the pair of components with the other component of the pair of components during execution of the software application.

A third aspect provided is a computer program product for generating a software application including a plurality of components, a first set of the components having metadata descriptors expressed in a structured definition language for defining configuration information of the software application and a second set of the components being expressed as a series of scripted instructions coupled to the metadata descriptors for defining a workflow of the software application, the software application for facilitating interaction with a schema-defined service by a terminal device over a network, the computer program product comprising: a computer readable medium; a workflow extractor module stored on the computer readable medium for identifying a workflow sequence generated by a modeling tool in an output of the modeling tool, the workflow sequence associated with at least one of a flow diagram and a relational diagram of the modeling tool for describing interactions between a pair of components of the first set of components; and a workflow generator module coupled to the workflow extractor module for generating a workflow mechanism based on the identified workflow sequence, the workflow mechanism configured for associating a processing of the metadata descriptors of one component of the pair of components with the other component of the pair of components during execution of the software application.

Network System

Referring to FIG. 1, an example network system 10 comprises mobile communication devices 100 for interacting with one or more Backend data sources 106 (e.g. a schema-based service such as Web service or database that provides enterprise services used by a software application 38) via a wireless network 102 coupled to an application gateway AG. The devices 100 are devices such as but not limited to mobile telephones, PDAs, two-way pagers, dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the application gateway AG and data sources 106 can be linked via extranets (e.g. the Internet) and/or intranets as is known in the art. The application gateway AG handles request/response messages initiated by the application 38 as well as subscription notifications pushed to the device 100 from the data sources 106. The Application Gateway AG can function as a Data Mapping Server for mediating messaging between a client runtime RE on the device 100 and a Backend server of the data sources 106. The Runtime Environment RE is an intelligent container that executes application 38 components and provides common services as needed for execution of the applications 38. The gateway AG can provide for asynchronous messaging for the applications 38 and can integrate and communicate with legacy back-end data sources 106. The devices 100 transmit and receive the Wireless Component Applications technology or wireless component applications 38, as further described below, when in communication with the data sources 106, as well as transmit/receive messaging associated with operation of the applications 38 when the applications 38 are provisioned on the device runtime environment RE and used for synchronous/asynchronous communication between the data source(s) 106 and the device 100. For example, the devices 100 can operate as Web clients of the data sources 106 through execution of the applications 38 when provisioned on respective runtime environments RE of the devices 100.

For satisfying the appropriate messaging associated with the applications 38, the application gateway AG communicates with the data sources 106 through various protocols (such as but not limited to HTTP, SQL, and component API) for exposing relevant business logic (methods) to the applications 38 once provisioned on the devices 100. The applications 38 can use the business logic of the data sources 106 similarly to calling a method on an object (or a function). It is recognized that the applications 38 can be downloaded/uploaded in relation to data sources 106 via the network 102 and application gateway AG directly to the devices 100. For example, the application gateway AG is coupled to a provisioning server 108 and a discovery server 110 for providing a mechanism for optimized over-the-air provisioning of the applications 38, including capabilities for application 38 discovery from the device 100 as listed in a UDDI (for example) registry 112. The Registry 112 can be part of the Discovery Service implemented by the server 110, and the registry 112 is used for publishing the applications 38. The application 38 information in the registry 112 can contain such as but not limited to a Deployment Descriptor DD (contains information such as application 38 name, version, and description) as well as the location of this application 38 in an application repository 114.

The generic services provided by the data source 106 can be Web Services and/or other services such as but not limited to SQL Databases, IDL-based CORBA and RMI/IIOP systems, Legacy Databases, J2EE, SAP RFCs, and COM/DCOM components. The Web service 106 can be defined as a software service, which can implement a network communication interface such as expressed using Web Services Description Language (WSDL) registered in Universal Discovery Description and Integration (UDDI) in a Web services registry, and can communicate through messages with client devices 100 by being exposed over the network 10 through an appropriate protocol such as the Simple Object Access Protocol (SOAP). In some implementations, SOAP is a specification that defines the XML format for the network messaging, including a well-formed XML fragment enclosed in SOAP elements. SOAP also supports document style applications where the SOAP message is a wrapper around an XML document. A further optional part of SOAP defines the HTTP binding (i.e. header), whereas some SOAP implementations support MSMQ, MQ Series, SMTP, or TCP/IP transport protocols. Alternatively, the data source 106 may use other known communication protocols, message formats, and the interface may be expressed in other Web services languages than described above.

Referring again to FIG. 1, for initialization of the runtime environment RE, the RE can receive the gateway AG URL and the gateway AG public key in a network data server 115 (e.g. Mobile Data Service) service book. The runtime environment RE uses this information to connect to the gateway AG for initial handshaking. Device 100 provisioning is implemented by a Web client system 118, depending on the domain, pushing the network data server 115 service book to the device 100. It is recognised there could be more than one gateway AG in the network 10, as desired. Once initialized, access to the applications 38 by the devices 100, as downloaded/uploaded, can be communicated via the gateway AG directly from the application repository 114, and/or in association with data source 106 direct access (not shown) to the repository 114.

Referring to again to FIG. 1, the applications 38 can be stored in the repository 114 as a series of packages that are developed in an application development system 116, which can be employed by developers of the applications 38. The application development system 116 is used to develop the Wired and/or Wireless Component Application 38 packages (see FIG. 3), including application 38 components (see FIG. 4) such as but not limited to screens 402, data elements 400, messages 404 and application workflow logic 406, as further defined below. The application 38 packages are represented as metadata (XML) that can be generated by the application development system 116 through a workflow code generation process. This application development system 116 can provide for the generated application 38 code to include or be otherwise augmented by an industry standard scripting language (e.g. JavaScript) or other scripting/programming languages known in the art for describing more complicated application logic, as further described below. The availability of the application 38 packages of the repository 114 are published via the discovery service of the server 110 in the registry 112. It is recognized that there can be more than one repository 114 and associated registries 112 as utilized by the particular network 10 configuration of the application gateway AG and associated data sources 106. It is recognised that the application development system 116 aids the developer in creating and modifying the coded definition content and workflow of the components 400,402,404,406 using the structured definition language (e.g. in XML) and the scripted elements. Further, the application development system 116 also aids the developer in creating, modifying, and validating the interdependencies of the definition content between the components 400,402,404, such as but not limited to message/data and screen/data relationships.

Component Applications 38

Figure 3:
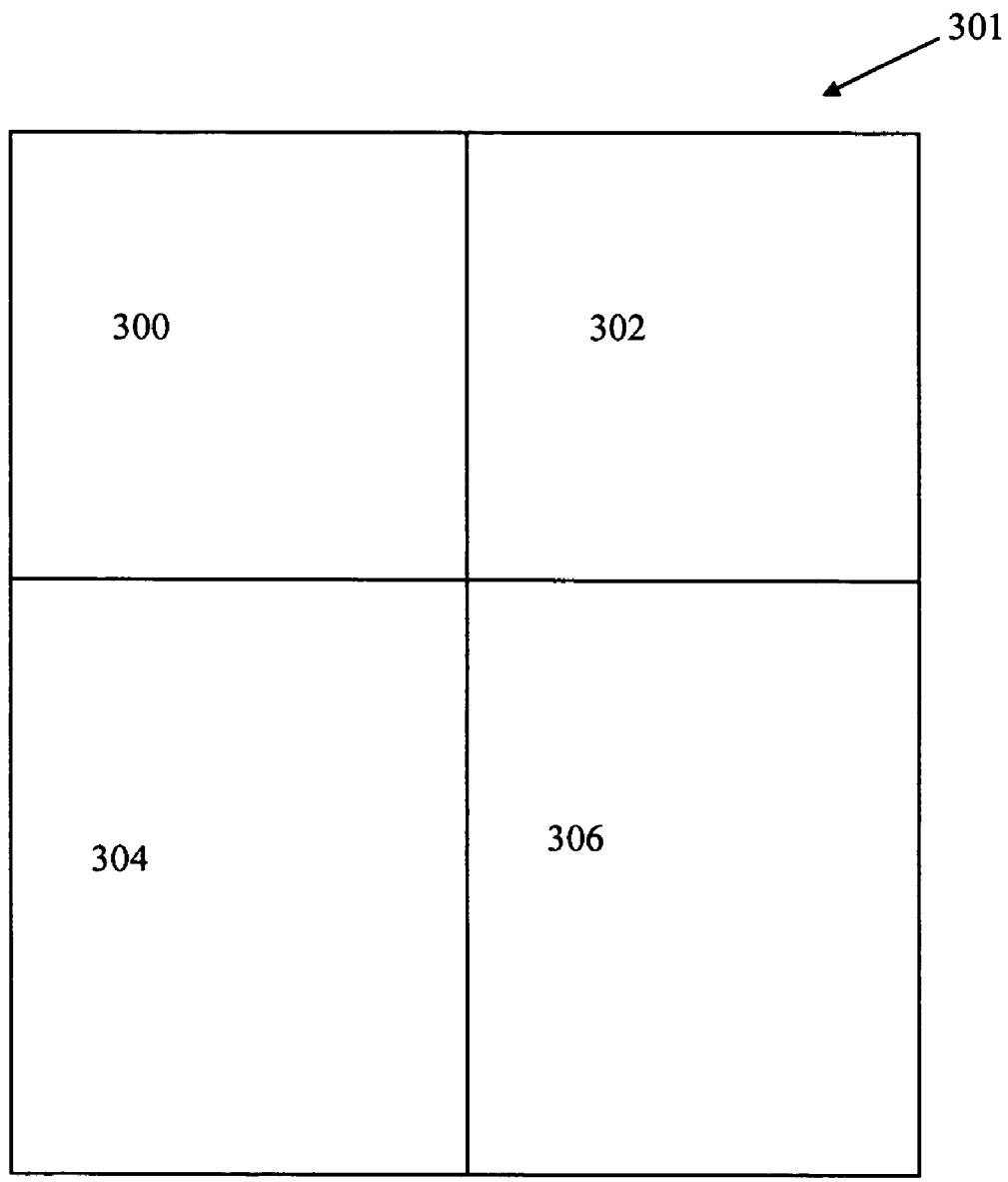
FIG. 3 is a block diagram of a package of the component application software of FIG. 1.

Referring to FIG. 3, the application 38 packages have application elements or artifacts 301 such as but not limited to XML definitions 300, mappings 302, application resources 304, and optionally resource bundle(s) 306 for localization support. XML file definitions 300 are XML coding of application data 400, messages 404, screens 402 components (optionally workflow 406), part of the raw application 38. It is recognised that XML syntax is used only as an example of any structured definition language applicable to coding of the applications 38. The application XML file 300 (e.g. application.def) is generically named and added to the top level (for example) of a jar file. The application 38 can be a Web Services client application expressed using a structured definition language, such as but not limited to XML, and a platform neutral scripting/programming language, such as but not limited to ECMAScript, with defined components conforming with an associated Document Type Definition (DTD).

Referring again to FIG. 3, application mapping 302 defines the relationship of content in the application messaging to Backend operation of the data sources 106. The application developer creates the mappings 302 using the application development system 116, whereby the gateway AG utilizes this mapping information 302 during communication of the application 38 request/response messages between the runtime RE, of the devices 100, and the data sources 106. The mapping information 302 is generated as an annotation to the data source 106 schema. Thus the mapping information 302 and the Backend data source 106 interface can be described in a single mapping information 302 file. For example, the data source 106 description will be a WSDL schema of a Web service. Further, there may be multiple such files 302 in the file 954 in the case that more than one Backend data source 106 is utilized by the application 38. All such files 302 can be grouped together within a mappings folder (not shown) and can be named according to the data source 106 service name. The file 302 extension can be based on the service type, for example. For example, the artifacts/elements file 301 can have one such file 302 for each Backend service supported by the application 38, e.g. mappings/WeatherService.wsdl and mappings/AirlineBookingSystem.wsdl.

The resources 304 are one or more resources (images, audio-clips, video-clips, media, etc . . . ) that are packaged with the application 38 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles 306 can contain localization information for each language supported by the application 38. These bundles can be located in a locale folder, for example, and can be named according to the language supported (e.g. locale/lang_en.properties and locale/lan_fr.properties).

It is recognised that the runtime environment RE of the device 100 is the client-resident container within which the applications 38 are executed on the device 100. The container manages the application 38 lifecycle on the device 100 (provisioning, execution, deletion, etc.) and is responsible for translating the metadata (XML) representing the application 38 into an efficient executable form on the device 100. The application 38 metadata is the executable form of the XML definitions 300, as described above, and is created and maintained by the runtime environment RE. The RE can provide a set of common services to the application 38, as well as providing support for optional JavaScript or other scripting languages. These services include support for such as but not limited to UI control, data persistence and asynchronous client-server messaging. It is recognised that these services could also be incorporated as part of the application 38, if desired.

Figure 4:
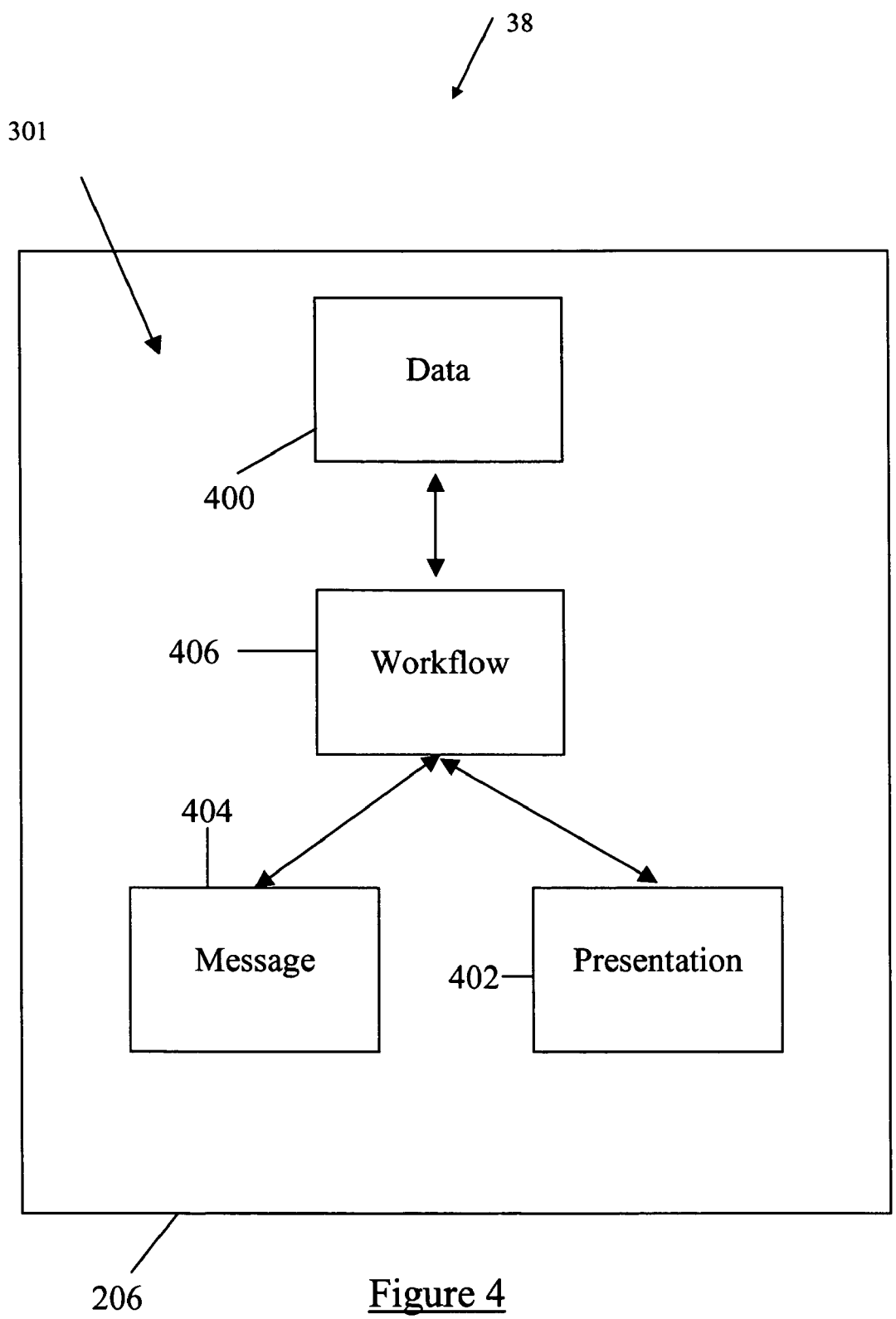
FIG. 4 is a block diagram illustrating example components of the software application of FIG. 3.

Referring to FIG. 4, the component applications 38 are software applications which can have artifacts 301 written, for example, in eXtensible Markup Language (XML) and a subset of ECMAScript. XML and ECMAScript are standards-based languages which allow software developers to develop the component applications 38 in a portable and platform-independent way. A block diagram of the component application 38 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), U.S. Government Information Locator Service (GILS), Encoded Archives Description (EAD), Instructional Management System (IMS) Global Learning Consortium, and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 38.

Referring again to FIG. 4, the data components 400 define data entities which are used by the component application 38. Data components 400 comprise a group of named, typed fields and define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

Referring again to FIG. 4, the message components 404 comprise a group of named, typed fields and define the format of messages used by the component application 38 to communicate with external systems such as the Web service. For example, one of the message components 404 may describe information such as but not limited to a message for placing an order which includes the unique identifier for the order, the status of the order, and notes associated with the order. It is recognised that data definition content of the components can be shared for data 400 and message 404 components that are linked or otherwise contain similar data definitions.

Referring again to FIG. 4, the presentation components 402 define the appearance and behavior of the component application 38 as it displayed by a user interface of the devices 100. The presentation components 402 may define screens, labels, edit boxes, buttons and menus, and actions to be taken when the user types in an edit box or pushes a button. Example presentation components 402 are such as but not limited to; a label, a separator, an image, a button, an edit field, a text area, a single-selection list, a multi-selection list, a drop-list, a checkbox, a radio button, or a screen containing a group of other presentation components 402. The presentation components 402 can be used to define a login screen, a order information screen, a delivery information screen, an order list screen, and an order status screen for presenting on a user interface of the device 100. Accordingly, the presentation components 402 can specify GUI screens and controls, and actions to be executed when the user interacts with the component application 38 using the user interface. It is recognised that data definition content of the components can be shared for data 400 and presentation 402 components that are linked or otherwise contain similar data definitions.

Referring to FIGS. 1 and 4, it is recognized that in the above described client component application 38 definitions hosting model, the presentation components 402 may vary depending on the client platform and environment of the device 100. For example, in some cases Web Service consumers do not require a visual presentation. The application definition of the components 400, 402, 404, 406 of the component application 38 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 38 is issued, the client type would be specified as a part of this request message. In order not to duplicate data, message, and workflow metadata while packaging component application 38 for different client platforms of the communication devices 100, application definitions can be hosted as a bundle of platform-neutral component definitions linked with different sets of presentation components 402. For those Web Service consumers, the client application 38 would contain selected presentation components 402 linked with the data 400 and message 404 components through the workflow components 406.

Referring again to FIG. 4, the workflow components 406 of the component application 38 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to ECMAScript, and can be (for example) compiled into native code and executed by the runtime environment RE, as described above. An example of the workflow components 406 may be to assign values to data, manipulate screens, or send the message 38. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100.

Referring to FIG. 4, the application 38 is structured using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 38 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, Web service for example, as defined by the message component 404.

In order to define the behavior of the component application 105, the workflow components 406 can use ECMAScript and/or cross-component mappings 18 (see FIG. 2) to reference and manipulate the data components 400, the presentation components 402, and the message components 404. Workflow components 406 can also reference external object types, which allow actions to be performed on the components defined in the component application 38. The message components 404 relay the required data for the input and output of the messages of the application 38. The corresponding data components 400 coordinate the storage of the data in memory of the device 100 for subsequent presentation on the user interface by the presentation components 402. The workflow components 406 coordinate the transfer of data between the data 400, presentation 402, and message 404 components. The workflow components 406 are written as a series of instructions, such as but not limited to ECMAScript.

The component-based application 38 architecture can result in component applications 38 in which the user-interface of the device 100 and the definition of the data are decoupled. This decoupling allows for modification of any component 400, 402, 404, 406 in the component application 38 while facilitating insubstantial changes to other components 400, 402, 404, 406 in the application 38, and thus can facilitate maintenance of the component applications 38, including modification and updating of the component applications 38 on the device 100.

Application Development System 116

Figure 2:
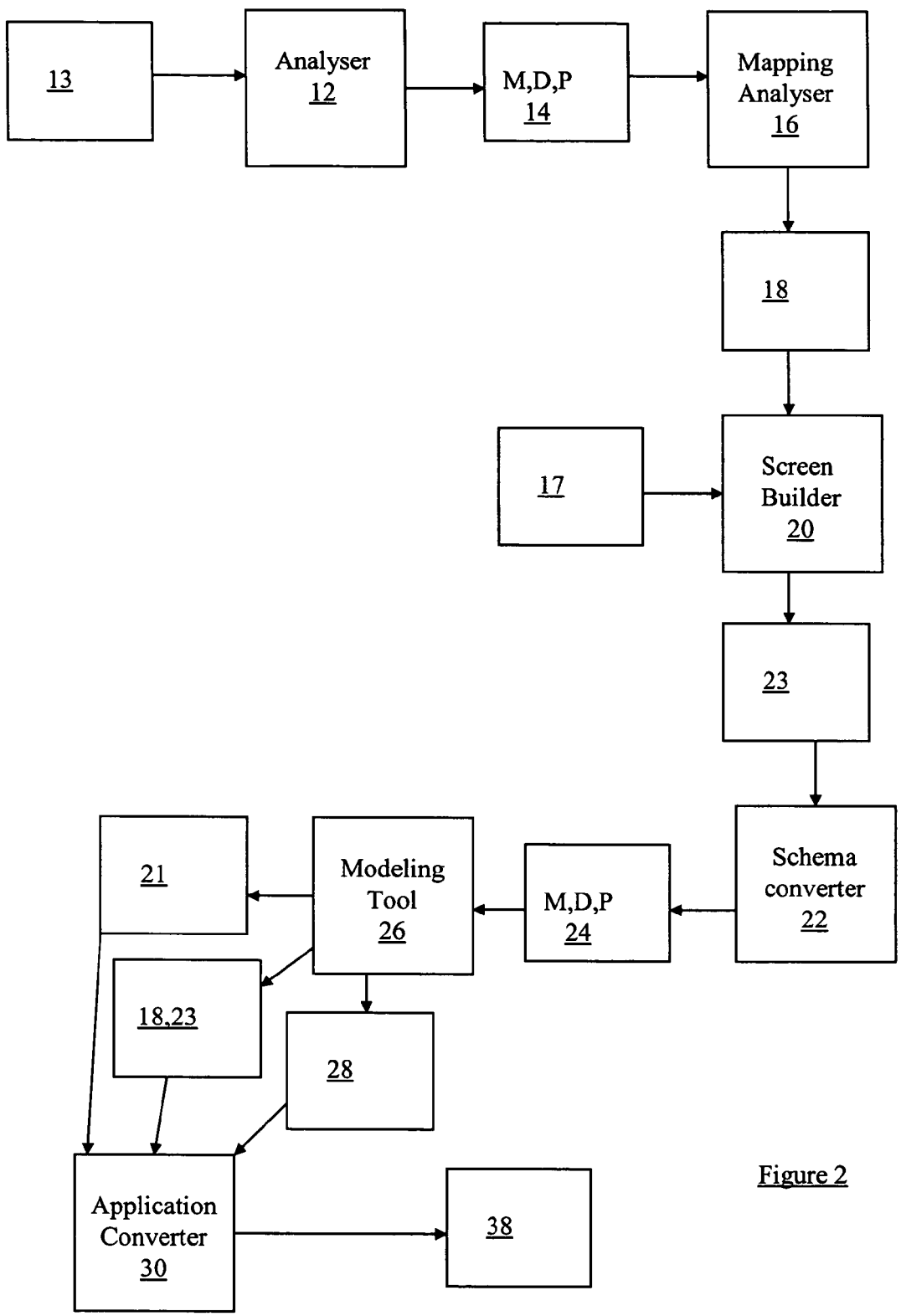
FIG. 2 is a block diagram of an application development system for assisting in the development of the software applications of FIG. 1.

Referring to FIG. 2, the application development system 116 for software applications 38 provides systems and methods for application developers (not shown) to leverage user defined orchestration of Web service operations to produce corresponding applications 38 for interaction with the data source 106 (e.g. Web service). An Analyzer 12 of the application development system 116 consumes a data source definition document 13 (e.g. WSDL) to produce data 400 and message 404 components as a component set 14 in a selected schema (e.g. schema "0"), based on defined complex types detected in the definition document 13. It is recognized that the definition document can include WSDL annotations and can also be based on the Business Process Execution Language (BPEL) standard, as desired. A Cross-Component Mapping Analyzer 16 analyzes the component set 14 to produce operations on data types based on operations/messages as determined from the data source definition document 13 to output a set of cross-component mappings 18 (e.g. datamessage), further described below. The component mappings 18 can be added to the component set 14. A Screen Builder 20 generates screen components 402 and screen-data mappings added to the component mappings 18 to represent the presentation of the data components 400 to the user of the device 100 via the device user interface (e.g. for Order data entity autogenerate screens OrderList, OrderDetails, etc.). The generated presentation components are added to the component set 14 in a first definition format (e.g. schema "0"), such that the components 400, 402, 404 are serialized into an XML document (e.g. components.xml) representing the component set 14. It is recognized that structured definition languages other than XML can be used to describe the components 400, 402, 404 in the component set 14, as desired. A Schema Converter 22 is used to convert, using for example XSLT as is known in the art, the generated components 400, 402, 404 into a component definition format 24 "importable" by a selected UML (or other) modeling tool 26, e.g. schema "1". The UML Tool 26 is then employed by the application developer through workflow diagram editors (for example) to define data relations and navigation flow between produced data, screens, and operations embodied in the component definitions 24, in order to produce a model 28 of the application 38 in the UML schema (e.g. schema 1 ). The UML tool 26 is then used to serialize the developed UML model 28 into a model 28 document (e.g. model.xml), including new and updated presentation components 402, screen/data/message mappings 18, and other more complex application workflow 21. An Application Converter 30 is used to extract workflow logic from the model 24 to produce script-based workflow extensions 34 (e.g. workflow components 406) and to run the corresponding transformation (e.g. XSLT) to convert the components 400, 402, 404 into the original structured definition language format defined by the application 38 (e.g. schema 0 as defined in a corresponding XSD or DTD), as output component set 32. The converter 30 is also used to update component 400, 402, 404 definitions to account for cross-component mappings 18, including any newly generated mappings using the UML tool 26. The converter 30 can also be used to validate and publish the completed application 38 by combining the cross-component mappings 18, the script-based workflow extensions 34, and the component set 32.

Figure 5:
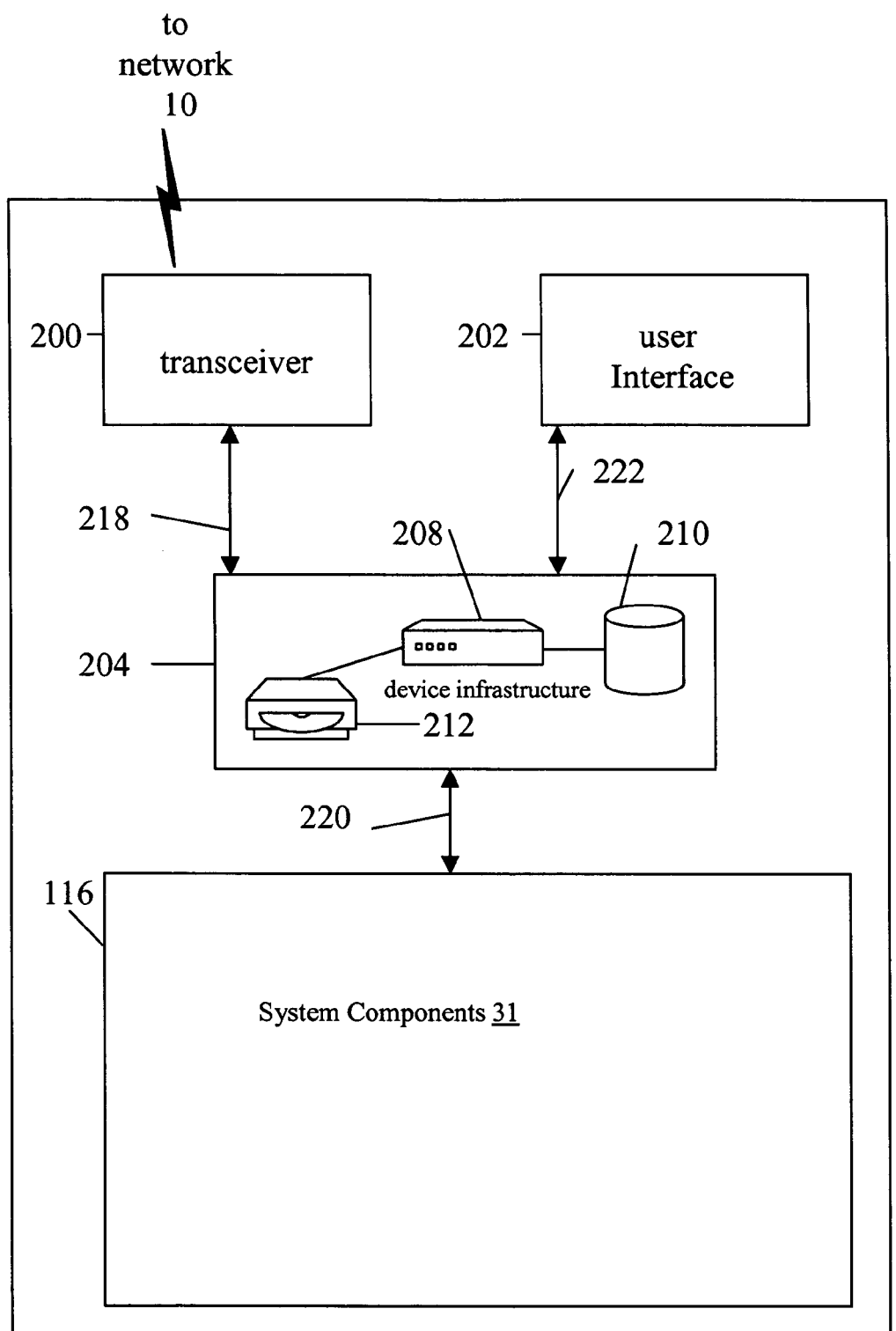
FIG. 5 is an example embodiment of the application development system of FIG. 2.

Referring to FIG. 5, the Application Development System 116 can be operated on a computer 201 as software having a plurality of modules representing the analyzer 12, the cross-component mapping analyzer 16, the screen builder 20, the schema converter 22, the UML tool 26, and the application converter 30, generically referred to as system components 31, as further described below. It is recognized that the system components 31 can be implemented on one computer 201 or on a number of computers in a network (not shown), as desired. Further, it is recognized that each of the components 31, or combination thereof, can be supplied as separate development tool software in the application development system 116, as desired. The computer 201 can be connected to the network 10 (see FIG. 1) via a network connection interface such as a transceiver 200 coupled via connection 218 to a device infrastructure 204. The transceiver 200 can be used to upload completed application programs 38 to the repository 114 (see FIG. 1), as well as access the registry 112 and selected data sources 106. Referring again to FIG. 5, the computer 201 also has a user interface 202, coupled to the device infrastructure 204 by connection 222, to interact with the developer (not shown). The user interface 202 can include one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the computer 201 to coordinate the design of applications 38 using the components 31 having a series of editors, viewers, and wizards to assist in the workflow of the application development process, as is known in the art.

Referring again to FIG. 5, operation of the computer 201 is enabled by the device infrastructure 204. The device infrastructure 204 includes a computer processor 208 and the associated memory module 210. The computer processor 208 manipulates the operation of the network interface 200, the user interface 202 and the display 206 by executing related instructions, which are provided by an operating system and application 38 design editors, wizards, dialogs and viewers of the components 31 resident in the memory module 210. Further, it is recognized that the device infrastructure 204 can include a computer readable storage medium 212 coupled to the processor 208 for providing instructions to the processor 208 and/or to load/design the applications 38 in development also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the application development system 116 is operated on the computer 201 as an application development environment for developing the applications 38. The development methodology of the application development system 116 can be based on a visual "drag and drop" system of building the application visual, data, messaging behaviour, and runtime navigation model 28. The components 31 of the application development system 116 can be structured as a set of plug-ins to a generic integrated design environment (IDE) framework, such as but not limited to the Eclipse framework, or the application development system 116 can be configured as a complete design framework without using plug-in architecture.

Application 38 Workflow Mechanisms

In generation of the applications 38, analysis of messaging and data requirements in the data source definition document 13 can provide the basis for workflow mechanisms to interconnect the operation and functionality of the components 400,402,404 to produce the cohesive application 38, comprising a plurality of interconnected components 400,402,404. The generation of these workflow mechanisms (e.g. components 406 and mappings 18,23) is done through the mapping analyzer 16 and the application converter 30, as further described below. Examples of these workflow mechanisms are; script-based workflow components 406 (described above) to help express more complex application 38 behaviour, and cross-component mappings 18,23 (see FIG. 2) further described below.

Mapping Relationships Between Components 400, 402, 404

It is noted that the expression of both messages 404, presentation 402 and data 400 as components bear certain similarities:

- each component 400, 402, 404 is identified by a unique name; and
- each component 400, 402, 404 specifies one or more subfields consisting of name and declared type.

Figure 6:
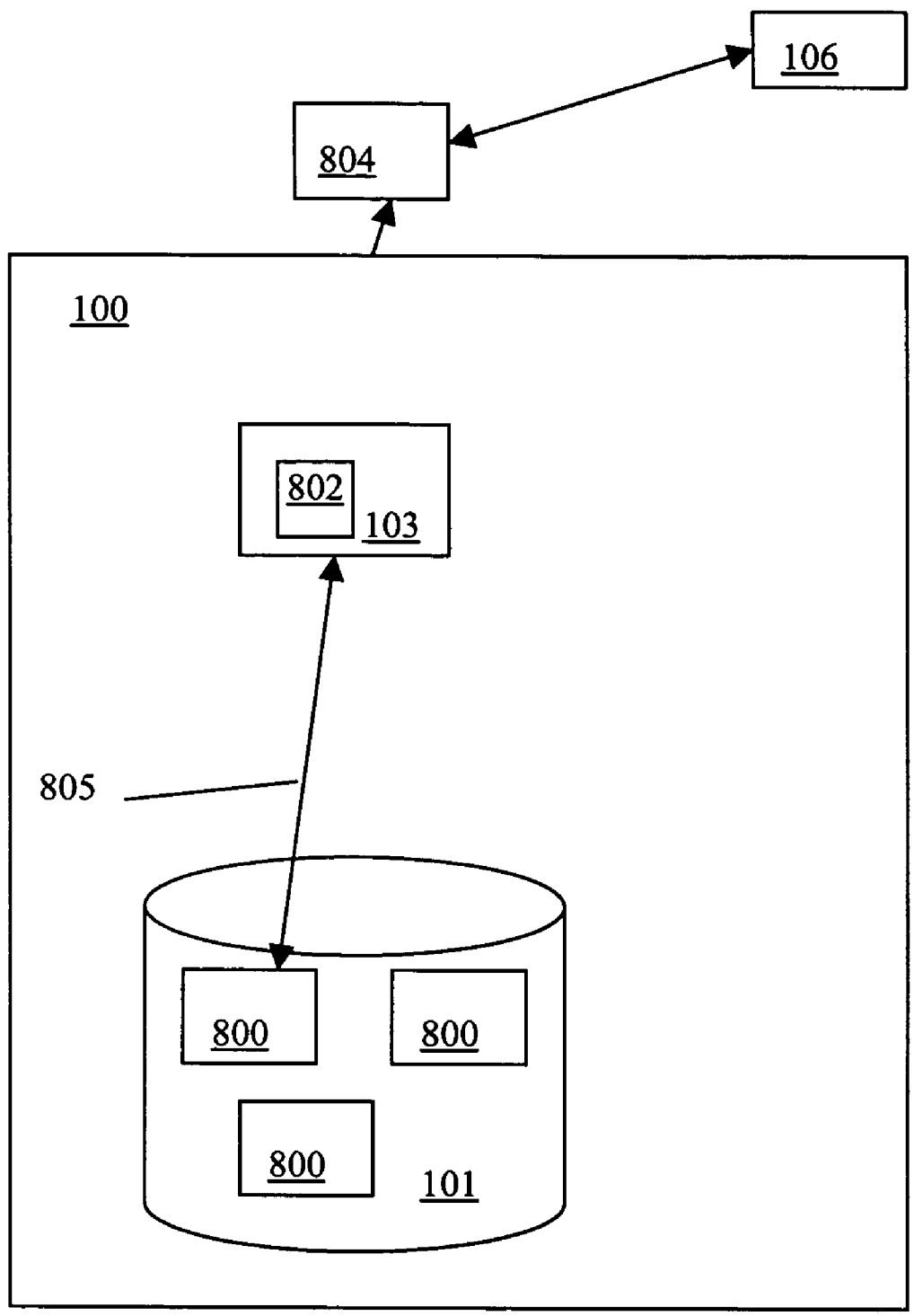
FIG. 6 shows component mappings of the components from the application of FIG. 1.

In practice, typically the expression of the components 400, 402, 404 by the developer can have overlapping content, while the behaviour of each of the components 400, 402, 404 of the application 38 is distinct. Therefore, by recognizing the fact that user interface content of the application 38 is often generated from some underlying data element, and in light of the similarities between expression of these components 400, 402, 404, it is convenient to introduce certain mappings 805 (see FIG. 6) to the expression/instances of data 400 message 404 and presentation 402 components, as data instances 800, screen elements 802 and messages 804 respectively. The messages 804 are communicated between the device 100 and the data source 106, the data instances 800 are stored in the storage 101 of the device 100, and the screen elements 802 are displayed on a display 103 of the device 100, such that the messages 804 are responsible for communicating the data instance 400 over the network 10, and the screen elements 802 are responsible for coordinating interaction of the device 100 user with the data instances 800. The mappings 805 are stated relationship(s) between the screen element definitions of the screen component 402 and the data component 400 definition, and between the message definitions of the message component 404 and the data component 400 definition. In relation to expression of the components 402, 404, using the mapping 805 can reduce the amount of metadata required to describe the component 402, 404. Thus use of the mapping 805 can have a direct effect on the amount of "code" required to describe the application 38. In relation to how the component 402, 404 behaves at runtime, the mapping 805 specifies how linked data instances 800 (described by the data component 400) are resolved and affected by respective screen element 802 and message 804 state. In this regard, specifying the mapping 805 can reduce the need for the developer to provide additional specific screen/message handling code in the application 38. Accordingly, each of the screen elements 802 and messages 804 are bound or mapped 805 to the fields of respective data object(s) 800. For example, any modifications of the screen elements 802 are propagated to the data object 800 mapped to the screen element 802. Similarly, all modifications (driven by the application 38 logic or incoming server messages 804) to the data objects 800 are reflected in respective screen elements 802 mapped to these data objects 800.

It is recognised that either the screen component 402 or data component 400 definitions contain the mapping 805, which defines the relationship between the data object 800 and screen element 802 or the relationship between an individual data field (or group of data fields) of the data object 800 with screen element 802. It is recognised that the data object 800 may be passed to the user display 103 as a parameter. In this case the data field values of the data object 800 mapped to the screen element 802 would be extracted from the passed parameter. For example, an edit control (e.g. screen element 802) defined in a screen field definition of the screen component 402 could be mapped into a data field definition of the linked data component 400 (i.e. a one to one mapping 805) or a choice control (screen element 802) defined in a screen field definition of the screen component 402 could be mapped into a particular data field definition of a collection of data components 400 (i.e. a one to many mapping 804). Accordingly, the data component 400 definitions can have a primary key or a composite key or optionally be defined without a key. These keys can be used with the mappings 18 to provide a unique link between the data components 400 and the message 404 and/or screen components 402.

Mapping Resolution Contract

Referring again to FIGS. 6 and 7*a*, the mapping 18 (an example of the mappings 805) between the data component 400 and the message component 404 rely upon a mapping resolution contract or mapping rule having a unique identifier 803. This mapping rule states that any mapping 18 attached to the data component 400 will map exactly one key field 803 per mapped data type. This mapping rule provides for unique identification and modification of the data instance affected by the mapping 18. The mapping rule states that the mapping 18 isolates the instance 800 of the data component 400 to which the message 804 content of the corresponding message component 404 is linked. Data instances 800 are resolved by the unique identifier 803 (e.g. a key). It is noted that the composition of this identifier 803 could be such as but not limited to a simple primary key or a composite key arising from more than one field 808. A single field 808 (such as a component name) in the Data definition of the data component 400 is identified as referenced by this identifier 803. The mapping resolution contract provides that exactly one primary key field 803 is involved in the mapping 18 to each linked data component 400. This one to one property of the mapping 18 provides for the unique the resolution of data instances to which incoming message 804 data applies. A particular data instance 800 is represented as a selected data component 400 that is assigned data values to each of the field names 808. The message instance 804 is represented as a selected message component 404 that is assigned data values to contained message field(s) through the mappings 18.

Two types of mappings 805 are described: field level mappings 901, and message level mappings 801. The following elaborates on how message 404 to data 400 component mappings 18 may be expressed, and specify a runtime resolution contract that exists to determine uniquely where message content is to be applied.

Message Level Mappings 801

Referring again to FIG. 7*a*, the Message level Mapping 801 is a mapping 18 from the message component 404 directly to the named data component 400 definition, such that message 804 field properties (message instance) are identical to those on the mapped data component 400. Message level mappings 801 state that the message instance 804 derives its complete specification from the linked data element of the data component 400. All fields described in the linked data component 400 will be present in the message instance 804, observing both field names 808, type declarations 810 and field order. For example, this type of message level mapping 801 can be convenient when the incoming or outgoing message instances 804 exactly duplicate the information represented by the data instance 800 of the data component 400. Referring to FIG. 7*b*, a sample message level mapping 801 between the Order data component 400 and the submitOrder message component 404 is illustrated. The mapping resolution contract for the mapping 801 is satisfied by the implicit linking of orderId primary key field 803. A sample structured definition language description (e.g. XML) of this relationship is provided in FIG. 7*b*. It is apparent from the XML expression that the size of the application 38 definition can be reduced by introducing this mapping 801, as the listing of arguments 812 of the data component 400 is not repeated in the linked message component 404.

Field Level Mappings 901

The Field level Mapping 901 (see FIG. 8*a*, 8*b*) provides a mapping 18 from a particular field 904 of the message component 404 definition to the named field 808 of the named data component 400 definition. Field level mappings 901 may arise where a more flexible arrangement of mappings 18 is required. In this configuration, each field mapping 901 specifies a linkage between each selected field 904 of the message instance 804 and the field 808 of the data instance corresponding to the data component 400. There may be any number of such field mappings 901. Field mappings 901 may involve only one target data component 400 (one-to-one linkage) or multiple data components 400 may be linked to the message instance 804 through separate field mappings 901 (one-to-many linkage). In order to satisfy the mapping resolution contract, the key field 803 is included for every data component 400 that is linked to the message component 404.

Referring to FIG. 8*a*, one-to-one mapping 901 arrangements incorporate a link to a single data component 400. One field mapping 901 is made to the field representing the primary key 803 of the data component 400, thus linking the message instance 804 with the data instance of the data component 400. Other mappings 901 are made between the selected message fields 904 of the component 404 and corresponding data fields 808 of the component 400. FIG. 8*a* depicts a typical field level mapping 901 relationship where a subset of the Part fields 808 are linked to the priceReduction message field 904. The mapping resolution contract is satisfied by making the link 901 to the partNo field which is identified as the key field 803 of Part. A sample XML expression for these relationships is provided in FIG. 8*b*, where Key field mapping 901 is shown in bold. It is recognised that the message instance 804 can have more than one message field 904, each mapped 901 to a respective data field 808 under the same key 803 (i.e. the message component 404 can be linked to two or more data fields 808 of the data component 400 using the same key 803).

Complex Mappings 1001

Referring to FIGS. 9*a* and 9*b*, a complex mapping 1000 arrangement consists of field level mappings 901 to two or more data components 400. As with the one-to-one mapping case of FIG. 7*a,b*, different unique ones of the primary key field 803 mapping is provided for every data component 400 linked through the set of field mappings 901. FIG. 9*b* shows an XML representation of the relationships between the orderUpdate message component 404 and the Order and Inventory data components 400. For each of the two data components 400 linked, a respective primary field mapping 901 with keys 803 is in place; orderId field key 803 for Order component 400 and partNo field key 803 for Inventory component 400. This satisfies the mapping resolution contract. These primary key field mappings 901 are shown in bold.

In view of the examples shown in FIGS. 7*a,b*, 8*a,b*, and 9*a,b*, other mapping 18 configurations are possible. Examples of such include such as but not limited to Extended Definition, Message Prototyping, and Arrival Event Processing, as further described below. An Extended Definition is a message component 404 that extends the message 801 or field 901 mapping configuration by defining additional un-mapped fields 904. This extended message instance 804 may extend its definition, in the presence of mappings 801, 901, by adding fields 904 that are not mapped to a respective data component 400 but rather complete their own specification within the message component definition 404. These fields 904 may be added to either the message 804 that has one or more field mappings 901, or the message 804 that is mapped 801 to a respective data component 400. Extended definition can provide an additional measure of flexibility to the specification of the mapped message 804. Message Prototyping can be defined as the ability to extend the stated definition of another message component 404. This mechanism has a similar effect as in object oriented inheritance; all the declared fields 904 of the parent message 804 will be available to the extending message 804. With regard to mapping 801, 901 relationships, the extending message mappings 801,901 could override any mapping specifications stated on the parent message 804. For Message Arrival Event Processing, the mapping mechanism can be further enhanced by permitting the association of additional processing code to the message reception. The body of processing code can be identified through the specification of the message component 404 through application XML. The processing code may be a script (such as ECMAScript) embodied in the application 38 (e.g. a workflow component 406), or may identify a standard native transformation offered by the Device Runtime environment RE (see FIG. 1).

Example XML Components 400, 404, 402 with Mappings 18

```
<data name="Order">
    <item name="orderId" type="Number" key="true"/>
    <item name="items" type="String" array="true"/>
    <item name="user" comp="true" compName="User"/>
        <item name="orderStatus" type="String"/>
</data>
...
<msg name="ordConfirmation" type="response"
action="mhConfirmation">
    <part name="orderId" type="String" />
    <part name="status" type="String" />
</msg>
...
<screen name="scrConfirmation" title="Order Confirmation"
param="Order">
    <layout type="vertical">
        <widget type="label" value="Order Confirmation Result:"/>
        < widget type="edit" value="@Order.OrderStatus@"/>
    </layout>
    ...
    <menu>
        <item label="Continue" navigate="@scrMain@"/>
        ...
    </menu>
</screen>
...
```

Example ECMAScript Workflow Component 406 for Above Mapped Components 400,402,404

```
<actions>
    <function name="mhConfirmation">
        key = ordConfirmation.orderId;
        order = Order.get(key);
        order.orderStatus = ordConfirmation.status;
        scrConfirmation.display(order);
    </function>
    ...
</actions>
```

It is recognized that the above presented example mappings 18 could also be given for similar screen-data mappings 23, if desired.

Components 31 with Application 38 Development Example

Referring again to FIG. 2, the components 31 of the application development system 116 are now described with reference to an example development of a shopping cart Web service model 28, as described by the following WSDL segment of the definition document 13.

```
Types:
...
    <complexType name="SearchParameters">
        <sequence>
            <element name="category" type="tns:Category"/>
            <element name="keywords" type="xsd:string"/>
        </sequence>
    </complexType>
    <complexType name="Item">
        <sequence>
            <element name="category" type="xsd:string"/>
            <element name="desc" type="xsd:string"/>
            <element name="id" type="xsd:string"/>
            <element name="imageURL" type="xsd:string"/>
            <element name="name" type="xsd:string"/>
            <element name="price" type="xsd:int"/>
        </sequence>
    </complexType>
    <complexType name="OrderItem">
        <sequence>
            <element name="item" type="tns:Item"/>
            <element name="itemId" type="xsd:string"/>
            <element name="quantity" type="xsd:int"/>
        </sequence>
    </complexType>
    <complexType name="Order">
        <sequence>
            <element name="address" type="xsd:string"/>
            <element name="cityAndRegion" type="xsd:string"/>
            <element name="country" type="xsd:string"/>
            <element name="items" type="impl:ArrayOf_tns_OrderItem"/>
            <element name="name" type="xsd:string"/>
            <element name="phone" type="xsd:string"/>
        </sequence>
    </complexType>
    <complexType name="OrderConfirmation">
        <sequence>
            <element name="confirmationCode" type="xsd:string"/>
            <element name="orderTime" type="xsd:dateTime"/>
        </sequence>
    </complexType>
    <complexType name="ArrayOf_tns_Item">
        <sequence>
            <element maxOccurs="unbounded"
                minOccurs="0" name="item" type="tns:Item"/>
        </sequence>
    </complexType>
    <complexType name="ArrayOf_tns_OrderItem">
        <sequence>
            <element maxOccurs="unbounded"
                minOccurs="0" name="item" type="tns:OrderItem"/>
        </sequence>
    </complexType>
...
Operations:
...
<wsdl:operation name="getItems">
    <wsdlsoap:operation soapAction=""/>
    <wsdl:input name="getItemsRequest">
        <wsdlsoap:body use="literal"/>
    </wsdl:input>
    <wsdl:output name="getItemsResponse">
        <wsdlsoap:body use="literal"/>
    </wsdl:output>
</wsdl:operation>
<wsdl:operation name="submitOrder">
    <wsdlsoap:operation soapAction=""/>
    <wsdl:input name="submitOrderRequest">
        <wsdlsoap:body use="literal"/>
    </wsdl:input>
    <wsdl:output name="submitOrderResponse">
        <wsdlsoap:body use="literal"/>
    </wsdl:output>
```

-continued

```
</wsdl:operation>
...
Elements (data parts):
...
<element name="parameters" type="tns:SearchParameters"/>
<element name="getItemsReturn" type="impl:ArrayOf_tns_Item"/>
<element name="order" type="tns:Order"/>
<element name="submitOrderReturn" type="tns:OrderConfirmation"/>
...
Messages:
...
<wsdl:message name="getItemsResponse">
    <wsdl:part element="impl:getItemsReturn" name="getItemsReturn"/>
</wsdl:message>
<wsdl:message name="getItemsRequest">
    <wsdl:part element="impl:parameters" name="parameters"/>
</wsdl:message>
<wsdl:message name="submitOrderRequest">
    <wsdl:part element="impl:order" name="order"/>
</wsdl:message>
<wsdl:message name="submitOrderResponse">
    <wsdl:part element="impl:submitOrderReturn" name=
    "submitOrderReturn"/>
</wsdl:message>
...
```

Analyzer 12

The analyzer 12 obtains the definition document 13 of the data source 106, either directly from the data source 106 over the network 10 or from a third party publishing service (not shown), and parses the metadata descriptors (e.g. XML content) of the definition document 13, including complex types, to identify data and message descriptors in order to generate corresponding data 400 and message 404 components in the component set 14, as given by example below. For example, the analyzer 12 identifies potential data components 400 through complex type definition content of the definition document 13 and identifies potential message components 404 though operations definition content of the definition document 13. The components 400, 404 can be generated by using component templates (not shown) as defined by the corresponding schema and DTDs for the component applications 38.

Data Components 400

```
<data name=" SearchParameters" >
    <field name=" category" type="nested:Category"/>
    <field name=" keywords" type="string"/>
</data>
<data name="Item">...</data>
<data name="OrderItem">...</data>
<data name="Order">...</data>
<data name="OrderConfirmation">...</data>
<data name="Category">...</data>
```

Message Components 404

```
<msg name="getItemsResponse">
    <field name="getItemsReturn" type=" array:nested:Item" />
</msg>
<msg name="getItemsRequest">
    <field name="parameters" type=" nested:SearchParameters" />
</msg >
<msg name="submitOrderRequest">
    <field name="order" type=" nested:Order" />
</msg >
<msg name="submitOrderResponse">
    <field name="orderReturn" type=" nested:OrderConfirmation" />
</msg >
```

Cross-Component Mapping Analyzer 16

The mapping analyzer 16 receives the component set 14 and analyzes the included message 404 and data 400 components for similar complex types, thus assuming that message components 404 having the same complex type definitions as selected data components 400 must be related. The mapping analyzer 16 can also use relational information to make connections between message 404 and data 400 components of the component set 14. The mapping analyzer 16 then generates coding for representing the mappings 18 based on the analysis and modifies the affected components 400, 404 accordingly to include the message 801, field 901 and/or complex 1001 mappings with corresponding key fields 803, as described above. Further, the mapping analyzer 16 can remove duplicate metadata definitions from one of the mapped components 400,404 from a component pair (e.g. remove the data field definitions from the message component 404 that are duplicates of those definitions contained in the linked data component 400), thereby producing a set of component mappings 18 that are embedded in the corresponding components 400,404 of the modified component set 14. The following mappings 18 are produced by mapping analyzer 16 based on the example data 400 and message 404 components.

```
<msgmap name="getItemsResponse" type=" createOrUpdate"
target=" array:Item" />
<msgmap name=" getItemsRequest" type=" sendOnCreateOrUpdate"
source=" SearchParameters" />
<msgmap name=" submitOrderResponse " type=" createOrUpdate"
target=" OrderConfirmation" />
<msgmap name=" submitOrderRequest " type=" sendOnCreateOrUpdate"
source=" Order" />
```

A Screen Builder 20

Referring again to FIG. 2, the screen builder 20 is responsible for generating presentation components 402 that correspond to messaging and data manipulation associated with the components 400,404. For example, the developer desires that the application 38 display all incoming data from messages received by the device 100 from the data source 106 on a screen displayed on the display 103 (see FIG. 6). Accordingly, the screen builder 20 can automatically generate all metadata for the corresponding screen component(s) 402, including a generic action button. Further, for all data of the message components 404 intended for transmission to the data source 106, the screen builder 20 can automatically and/or manually generate all metadata for the corresponding screen component(s) 402, including a generic "send" button. In this manner, the screen builder 20 can generate a plurality of screen components 402 that allow for user interaction with data and messages associated with the data 400 and message 404 components of the component set 14. Further, the screen builder 20 can generate additional screen-data mappings 23 similar to the message-data mappings 18 generated by the mapping analyzer 16. The screen builder 20 can make use of screen templates 17 as provided by an administrator of the application development system 116 and/or designed by the user(s) of the application development system 116. These templates can contain generic placement and design of screen elements 802 to assist the developer in initial design of the screen components 402, which can be further customized using the UML tool 26, for example, as further described below. The generated presentation components 402 and any related screen-data mappings 23 can be added to update the component set 14. The following example presentation components 402 and mappings 23 produced by Screen Builder 20 based on the example components 400,404.

```
<screen name=" scrSearchParameters" >
   <region name=" category">
      <choice name=" categories" source=" nested:Category[ ].name"
      target=" SearchParameters.category" />
   </region>
   <edit name=" keywords" target=" SearchParameters.keywords" />
   <button action=" send: SearchParameters" target=" getItemsRequest"
</screen>
<screen name=" scrItemArray" >
   <choice name=" itemCategory" source=" array:Item.category"
   target=" Item" />
   <button action=" display:scrItem" target=" scrItem"
</screen>
<screen name=" scrItem" >
   <label name="category" source=" Item.category"/>
   <label name="desc" source=" Item.desc"/>
   <label name="id" source=" Item.id"/>
   <label name="imageURL" source=" Item.imageURL"/>
```

-continued

```
      <label name="name" source=" Item.name"/>
      <label name="price" source="xsd:price"/>
</screen>
...
<screenmap name="scrSearchParameters" type=" createOrUpdate"
target=" SearchParameters" />
<screenmap name="scrItemArray" type=" show" source=" array:Item" />
<screenmap name="scrItemArray" type=" select" target=" Item" />
<screenmap name="scrItem" type=" show" source=" Item" />
...
```

Schema Converter 22

The schema converter uses a schema translation tool, such as but not limited to XSLT, to convert the syntax and formatting of the components 400,402,404 and mappings 18,23 into a format suitable for importing by the modeling tool 26, as defined by the model tool 26 schema (not shown). The resulting transformed component set 24, containing transformed components 400,402,4404, by example as an XML document is as follows, where it is assumed that the target model tool 26 supports either XMI (XML Metadata Interchange standard http://www.omg.org/cgi-bin/doc?formal/2002-01-01) or some custom XML schema for UML model import/export. While the most up-to-date version of XMI is 2.1 we present the example in ver. 1.1 as it is supported by most UML model tools 26 on the market.

```
<?xml version="1.0" encoding="UTF-8"?>
<XMI xmi.version="1.1">
    <XMI.header>
      <XMI.documentation>
         <XMI.exporter>RIM</XMI.exporter>
         <XMI.exporterVersion>1.0</XMI.exporterVersion>
      </XMI.documentation>
      <XMI.metamodel xmi.name="UML" xmi.version="1.1"/>
    </XMI.header>
    <XMI.content>
      <Model_Management.Model xmi.id="xmi.1" xmi.uuid="-123--11--22--33-abc1234:cdef56:-
8000">
<Foundation.Core.ModelElement.name>untitled</Foundation.Core.ModelElement.name>
         <Foundation.Core.ModelElement.isSpecification xmi.value="false"/>
         <Foundation.Core.GeneralizableElement.isRoot xmi.value="false"/>
         <Foundation.Core.GeneralizableElement.isLeaf xmi.value="false"/>
         <Foundation.Core.GeneralizableElement.isAbstract xmi.value="false"/>
         <Foundation.Core.Namespace.ownedElement>
<!--data component: SearchParameters --->
            <Foundation.Core.Class xmi.id="xmi.2" xmi.uuid="...">
<Foundation.Core.ModelElement.name>SearchParameters</Foundation.Core.ModelElement.name>
             <Foundation.Core.ModelElement.isSpecification xmi.value="false"/>
             <Foundation.Core.GeneralizableElement.isRoot xmi.value="false"/>
             <Foundation.Core.GeneralizableElement.isLeaf xmi.value="false"/>
             <Foundation.Core.GeneralizableElement.isAbstract xmi.value="false"/>
             <Foundation.Core.Class.isActive xmi.value="false"/>
             <Foundation.Core.ModelElement.namespace>
                <Foundation.Core.Namespace xmi.idref="xmi.1"/>
             </Foundation.Core.ModelElement.namespace>
             <Foundation.Core.Classifier.feature>
                <Foundation.Core.Attribute xmi.id="xmi.3">
<Foundation.Core.ModelElement.name>category</Foundation.Core.ModelElement.name>
                   <Foundation.Core.ModelElement.isSpecification xmi.value="false"/>
                   <Foundation.Core.Feature.owner>
                      <Foundation.Core.Classifier xmi.idref="xmi.2"/>
                   </Foundation.Core.Feature.owner>
                   <Foundation.Core.StructuralFeature.type>
                      <Foundation.Core.Classifier xmi.idref="xmi.4"/>
                   </Foundation.Core.StructuralFeature.type>
                </Foundation.Core.Attribute>
                <Foundation.Core.Attribute xmi.id="xmi.5">
```

```
<Foundation.Core.ModelElement.name>keywords</Foundation.Core.ModelElement.name>
            <Foundation.Core.ModelElement.isSpecification xmi.value="false"/>
            <Foundation.Core.Feature.owner>
               <Foundation.Core.Classifier xmi.idref="xmi.2"/>
            </Foundation.Core.Feature.owner>
            <Foundation.Core.StructuralFeature.type>
               <Foundation.Core.Classifier xmi.idref="xmi.6"/>
            </Foundation.Core.StructuralFeature.type>
         </Foundation.Core.Attribute>
         <Foundation.Core.Attribute xmi.id="xmi.7">
       </Foundation.Core.Classifier.feature>
      </Foundation.Core.Class>
      <Foundation.Core.DataType xmi.id="xmi.4">
<Foundation.Core.ModelElement.name>array:Category</Foundation.Core.ModelElement.name>
         <Foundation.Core.ModelElement.isSpecification xmi.value="false"/>
         <Foundation.Core.GeneralizableElement.isRoot xmi.value="false"/>
         <Foundation.Core.GeneralizableElement.isLeaf xmi.value="false"/>
         <Foundation.Core.GeneralizableElement.isAbstract xmi.value="false"/>
         <Foundation.Core.ModelElement.namespace>
            <Foundation.Core.Namespace xmi.idref="xmi.1"/>
         </Foundation.Core.ModelElement.namespace>
            <Foundation.Core.StructuralFeature.type>
               <Foundation.Core.Classifier xmi.idref="xmi.7"/>
            </Foundation.Core.StructuralFeature.type>
      </Foundation.Core.DataType>
      <Foundation.Core.DataType xmi.id="xmi.6">
<Foundation.Core.ModelElement.name>string</Foundation.Core.ModelElement.name>
         <Foundation.Core.ModelElement.isSpecification xmi.value="false"/>
         <Foundation.Core.GeneralizableElement.isRoot xmi.value="false"/>
         <Foundation.Core.GeneralizableElement.isLeaf xmi.value="false"/>
         <Foundation.Core.GeneralizableElement.isAbstract xmi.value="false"/>
         <Foundation.Core.ModelElement.namespace>
            <Foundation.Core.Namespace xmi.idref="xmi.1"/>
         </Foundation.Core.ModelElement.namespace>
      </Foundation.Core.DataType>
      </Foundation.Core.Class>
      <Foundation.Core.Class xmi.id="xmi.7">
<Foundation.Core.ModelElement.name>Category</Foundation.Core.ModelElement.name>
         <Foundation.Core.ModelElement.isSpecification xmi.value="false"/>
         <Foundation.Core.GeneralizableElement.isRoot xmi.value="false"/>
         <Foundation.Core.GeneralizableElement.isLeaf xmi.value="false"/>
         <Foundation.Core.GeneralizableElement.isAbstract xmi.value="false"/>
         <Foundation.Core.Class.isActive xmi.value="false"/>
         <Foundation.Core.ModelElement.namespace>
            <Foundation.Core.Namespace xmi.idref="xmi.1"/>
         </Foundation.Core.ModelElement.namespace>
      </Foundation.Core.Class>
<!--data component: Item --->
         <Foundation.Core.Class xmi.id="xmi.8" xmi.uuid="...">
<Foundation.Core.ModelElement.name>Item</Foundation.Core.ModelElement.name>
      ...
<!--msg component: getItemsRequest --->
         <Foundation.Core.Class xmi.id="xmi.20" xmi.uuid="...">
<Foundation.Core.ModelElement.name>getItemsRequest</Foundation.Core.ModelElement.name>
      ...
<!--screen component: scrSearchParameters --->
         <Foundation.Core.Class xmi.id="xmi.40" xmi.uuid="...">
<Foundation.Core.ModelElement.name>scrSearchParameters</Foundation.Core.ModelElement.name>
      ...
<!--data-msg mappings: getItemsResponse x Item --->
         <Foundation.Core.Association xmi.id="xmi.64" xmi.uuid="...">
<Foundation.Core.ModelElement.name>getItemsResponseToItem</Foundation.Core.ModelElement.name>
            <Foundation.Core.ModelElement.isSpecification xmi.value="false"/>
            <Foundation.Core.GeneralizableElement.isRoot xmi.value="false"/>
            <Foundation.Core.GeneralizableElement.isLeaf xmi.value="false"/>
            <Foundation.Core.GeneralizableElement.isAbstract xmi.value="false"/>
            <Foundation.Core.ModelElement.namespace>
               <Foundation.Core.Namespace xmi.idref="xmi.1"/>
            </Foundation.Core.ModelElement.namespace>
            <Foundation.Core.Association.connection>
               <Foundation.Core.AssociationEnd xmi.id="xmi.65">
                  <Foundation.Core.ModelElement.isSpecification xmi.value="false"/>
                  <Foundation.Core.AssociationEnd.isNavigable xmi.value="false"/>
                  <Foundation.Core.AssociationEnd.ordering xmi.value="ordered"/>
                  <Foundation.Core.AssociationEnd.multiplicity>
                     <Foundation.Data_Types.Multiplicity xmi.id="xmi.66">
                        <Foundation.Data_Types.Multiplicity.range>
                           <Foundation.Data_Types.MultiplicityRange xmi.id="xmi.67">
```

-continued

```
<Foundation.Data_Types.MultiplicityRange.lower>1</Foundation.Data_Types.MultiplicityRange.lower>
<Foundation.Data_Types.MultiplicityRange.upper>1</Foundation.Data_Types.MultiplicityRange.upper>
        </Foundation.Data_Types.MultiplicityRange>
      </Foundation.Data_Types.Multiplicity.range>
    </Foundation.Data_Types.Multiplicity>
  </Foundation.Core.AssociationEnd.multiplicity>
  <Foundation.Core.AssociationEnd.association>
    <Foundation.Core.Association xmi.idref="xmi.64"/>
  </Foundation.Core.AssociationEnd.association>
<!---link to getItemsResponse message--->
  <Foundation.Core.AssociationEnd.type>
    <Foundation.Core.Classifier xmi.idref="xmi.20"/>
  </Foundation.Core.AssociationEnd.type>
</Foundation.Core.AssociationEnd>
<Foundation.Core.AssociationEnd xmi.id="xmi.68">
  <Foundation.Core.ModelElement.isSpecification xmi.value="false"/>
  <Foundation.Core.AssociationEnd.isNavigable xmi.value="true"/>
  <Foundation.Core.AssociationEnd.multiplicity>
    <Foundation.Data_Types.Multiplicity xmi.id="xmi.69">
      <Foundation.Data_Types.Multiplicity.range>
        <Foundation.Data_Types.MultiplicityRange xmi.id="xmi.10">
<Foundation.Data_Types.MultiplicityRange.lower>1</Foundation.Data_Types.MultiplicityRange.lower>
<Foundation.Data_Types.MultiplicityRange.upper>1</Foundation.Data_Types.MultiplicityRange.upper>
        </Foundation.Data_Types.MultiplicityRange>
      </Foundation.Data_Types.Multiplicity.range>
    </Foundation.Data_Types.Multiplicity>
  </Foundation.Core.AssociationEnd.multiplicity>
  <Foundation.Core.AssociationEnd.association>
    <Foundation.Core.Association xmi.idref="xmi.64"/>
  </Foundation.Core.AssociationEnd.association>
<!---link to Item data--->
  <Foundation.Core.AssociationEnd.type>
    <Foundation.Core.Classifier xmi.idref="xmi.8"/>
  </Foundation.Core.AssociationEnd.type>
</Foundation.Core.AssociationEnd>
     </Foundation.Core.Association.connection>
   </Foundation.Core.Association>
<!---data-msg mappings: getItemsRequest x SearchParameters --->
...
<!---screen-data mappings: scrSearchParameters x SearchParameters --->
...
     </Foundation.Core.Namespace.ownedElement>
   </Model_Management.Model>
  </XMI.content>
</XMI>
```

The XML/XMI component set 24 described above represents the application model auto-generated in cooperation with the analyzer 12, the mapping analyzer 16, and the screen builder 20. The component set 24 is imported into the UML modeling tools 26, as further described below.

The Modeling Tool 26

Figure 10:
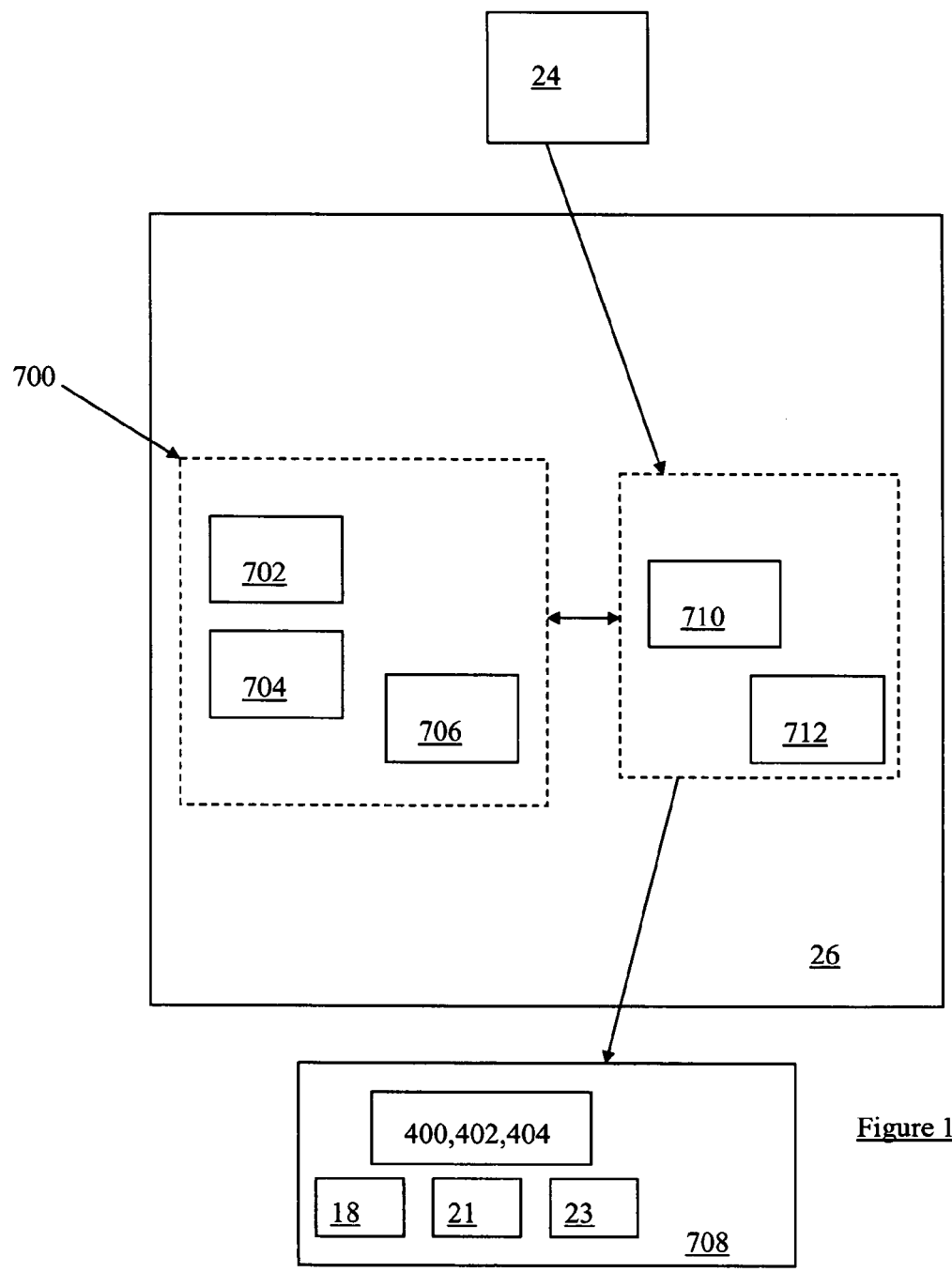
FIG. 10 is a block diagram of an example modeling tool of the application development system of FIG. 2.

Referring to FIG. 10, the modeling tool 26 can be extended to provide custom editors, wizards, project management and a host of other functionality. The modeling tool 26 provides a series of sequential diagrams that are used to denote and produce relations as sequences 21 (e.g. in pseudocode) between the various components 400,402,404 of the application model 28, as well as any updates to the mappings 18,23 where desired. For example, UML versions of the modeling tool 26, Unified Modeling Language™ (UML™), is used for specifying, visualizing, constructing, and documenting the artifacts of the application model 28. The modeling tool 26 can be designed for a wide range of users, including Software Engineers, System Analysts, Business Analysts, System Architects alike, who are interested in building large scale software systems reliably through the use of the Object-Oriented approach. The application model 28 can have two distinct characteristics: a structural, "static" part and a behavioral, "dynamic" part. In addition to these two characteristics, an additional characteristic that the application model 28 possesses is related to implementation. Static characteristics of the application model 28 are the structural aspect of the application 38. The static characteristics define what parts the application 38 is made up of. Dynamic characteristics of the application model 28 define the behavioral features of the application 38, for example, the ways the application 38 behaves in response to certain events or actions. Implementation characteristics of the application model 28 describe the different elements required for deploying the application 38. The modeling tool 26 uses diagrams 700 including: Static diagrams 702, namely Use case diagrams and Class diagrams; Dynamic diagrams 704, namely Object diagrams, State diagrams, Activity diagrams, Sequence diagrams, and Collaboration diagrams; and Implementation diagrams 706, namely component diagrams and deployment diagrams.

The modeling tool 26 may not be limited to just a pictorial depiction of diagrams because the structure of the application 38 defined by the diagrams is translated by the developer into actual source code (classes). The UML tool 26 can bridge this step by generating the source code of the classes with the methods stubbed out. Developers can take up this stub code and fill in with the actual code. The modeling tool 26 also can load all the files of the application model 28, identify dependencies between the various classes, and essentially reconstruct the entire application model 28 structure along with all the relationships between the classes. In addition, the modeling tool 26 can support the generation of reports/listings of the different design elements of the diagrams.

The following is a brief description of the various diagrams 700. For the Static diagrams 702, a use case diagram is used to identify the primary elements and processes that form the application 38. The primary elements are termed as "actors" and the processes are called "use cases." The use case diagram shows which actors interact with each use case. The main purpose of the use-case diagram is to help development teams visualize the functional requirements of the application 38, including the relationship of "actors" (human beings who will interact with the system) to essential processes, as well as the relationships among different use cases. A class diagram, of the Static diagrams 702, is used to refine the use case diagram and define a detailed design of the application 38. The class diagram classifies the actors defined in the use case diagram into a set of interrelated classes. The relationship or association between the classes can be either an "is-a" or "has-a" relationship. Each class in the class diagram may be capable of providing certain functionalities. These functionalities provided by the class are termed "methods" of the class. Apart from this, each class may have certain "attributes" that uniquely identify the class.

For the dynamic diagrams 704, an object diagram is a special kind of class diagram. An object is an instance of a class. This essentially means that an object represents the state of a class at a given point of time while the application 38 is running. The object diagram captures the state of different classes in the application 38 and their relationships or associations at a given point of time. A state diagram, of the dynamic diagrams 704, represents the different states that objects in the application 38 undergo during their life cycle. Objects in the application 38 change states in response to events. In addition to this, the state diagram also captures the transition of the object's state from an initial state to a final state in response to events affecting the application 38. An Activity diagram, of the dynamic diagrams 704, captures the process flows in the application 38. Similar to the state diagram, the activity diagram also consists of activities, actions, transitions, initial and final states, and guard conditions. Activity diagrams show the procedural flow of control between two or more class objects while processing an activity. Activity diagrams can be used to model higher-level business process at the business unit level, or to model low-level internal class actions. A sequence diagram, of the dynamic diagrams 704, represents the interaction between different objects in the application 38. The important aspect of the sequence diagram is that it is time-ordered. This means that the exact sequence of the interactions between the objects is represented step by step. Different objects in the sequence diagram interact with each other by passing "messages", for example according to the message components 404. The sequence diagram can have two dimensions: The vertical dimension shows the sequence of messages/calls in the time order that they occur; the horizontal dimension shows the object instances to which the messages are sent. A collaboration diagram, of the dynamic diagrams 704, groups together the interactions between different objects. The interactions are listed as numbered interactions that help to trace the sequence of the interactions. The collaboration diagram helps to identify all the possible interactions that each object has with other objects, including mappings 18,22, and 21.

For the implementation diagrams 706, a Component diagram represents the high-level parts that make up the application 38. This diagram depicts, at a high level, what components 400,402,404 form part of the application 38 and how they are interrelated. A component diagram can also depict the components 400,402,404 culled after the application 38 has undergone the development or construction phase. The component diagram can provide a physical view of the application 38, showing the dependencies that the application 38 has on the other software applications (e.g. software libraries) external to the application 38. A Deployment diagram, of the implementation diagrams 706, captures the configuration of the runtime elements of the application 38. The deployment diagram shows how the application 38 will be physically deployed in the hardware environment of the device 100, showing how different components 400,402,404 of the application 38 will physically run and how they will communicate with each other.

Once completed, the modeling tool 26 generates modeling output 708 through component/class editors 710 in conjunction with the diagrams 700 to add additional presentation 402 and data 400 components and to update component 400,402, 404 relations. With a workflow editor 712, the application designer builds flow diagrams that represent application workflow (for eventual representation as the workflow components 406). Accordingly, the workflow editor 712 is used to define further data relationships and navigation flow between produced data 400, presentation 402, and message 404 (operations) components as workflow sequences 21 (e.g. UML) that define workflow logic not already generated through the screen builder 20 and mapping analyzer 16. For example, the workflow sequences 21 could represent workflow more complex than can not be adequately represented by the component mappings 18,23 and/or could represent component mappings 18,23 in addition (or amended) to those produced by the screen builder 20 and/or mapping analyzer 16. Finally the resulting model 28 is exported in the modeling output 708 as an XMI document similar to the one described above with reference to the converter 22 (i.e. component set 24), for example. This modeling output 708 is now ready to be consumed by the Application Converter 30.

Application Converter 30

Figure 11:
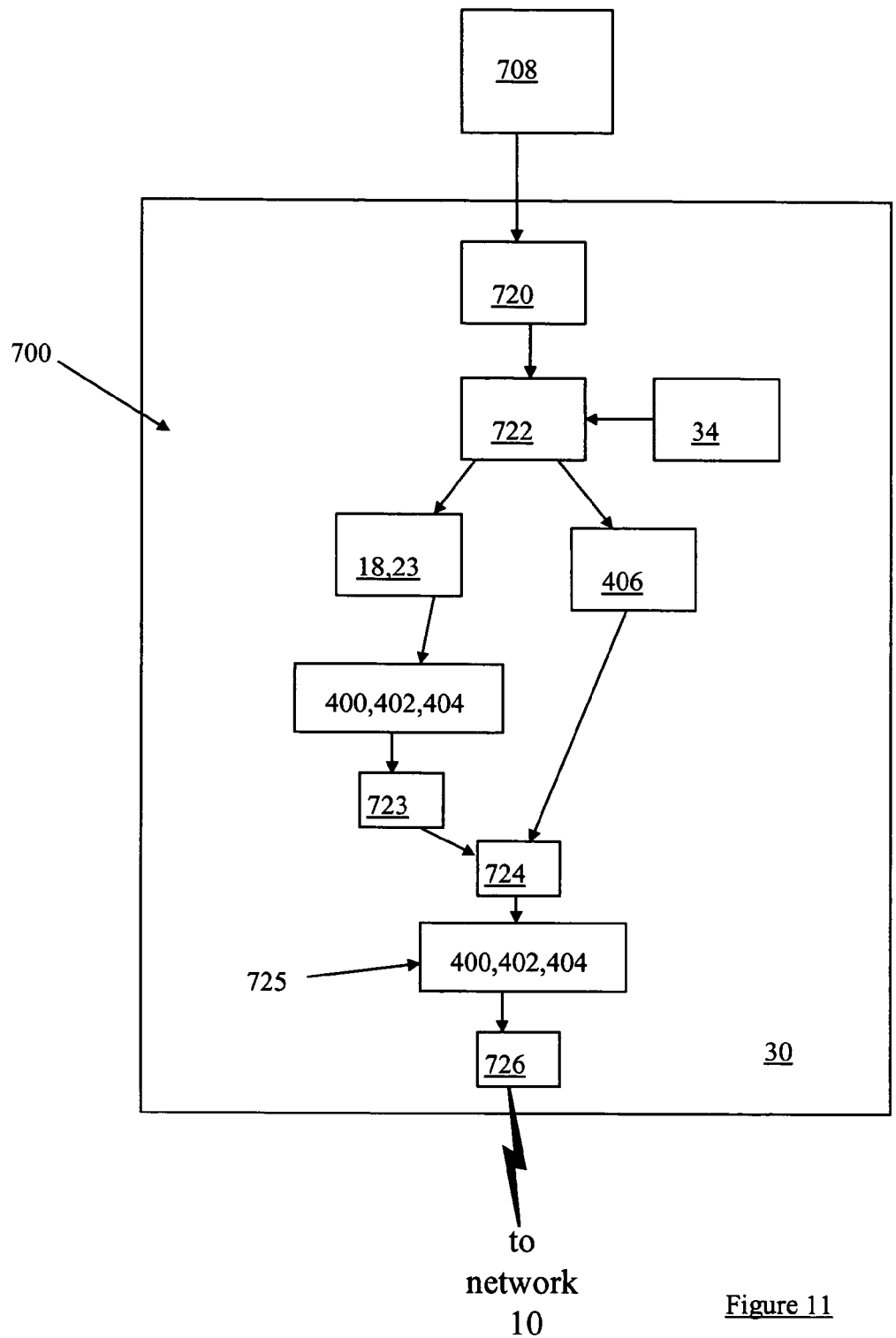
FIG. 11 is a block diagram of an example application converter of the application development system of FIG. 2.

Referring to FIG. 11, the application converter 30 has a workflow extractor 720 for identifying the modeling sequences 21 from the modeling output 708 and for classifying the sequences as either suitable for representation as component mappings 18,23 or suitable as representation by workflow script (as described above in relation to workflow mechanisms. A workflow generator 722 consumes the identified modeling sequences 21 in order to generate appropriate mappings 18,23 for insertion into the corresponding component(s) 400,402,404 with modification of component 400, 402,404 metadata definitions where required (e.g. removal of syntax duplication between linked components 400,402,404). It is recognized that the workflow generator 722 manipulation of the mappings 18,23 can include deletion/modification of existing mappings 18,23, as well as the generation of new mappings 18,23. The workflow generator 722 also consumes the identified modeling sequences 21 and can make use of script templates 34 for facilitating the generation of corresponding scripted workflow components 406, which can be used to represent application 38 workflow behaviour that is more efficient (or too complex) than expressed as component mappings 18,23. An example of the workflow templates 34 can include; when using a flow diagram of the sequences 21, the presence of action buttons on a screen of the application 38 provides for the scripted workflow component 406 to state the sending of an appropriate message over the network 102 (see FIG. 1) includes the associated data definitions manipulated by each of the action buttons. A further example of the workflow templates 34 can include; when using a relational diagram of the sequences 21 (e.g. screen 1 uses data definition 1, screen 2 uses data definition 2, screen 3 uses data definition 3), messages associated with the action buttons are to include the associated data definitions manipulated by each of the action buttons. The example script generated by the workflow generator 722 for this example could be as follows:

MSG,MF1=SCR1 send C1(value)
MSG,MF2=SCR2 send C2(value)
MSG,MF3=SCR3 send C3(value)
MSG, SEND For example, the Foundation.Core.Operation blocks and exported flow diagrams described above for the modeling output 708 will be converted to cross-component mappings 18,23 where possible, otherwise the converter 30 generates JavaScript operations (e.g. workflow components 406), an example of which is given below.

Example. The operation validateUser on UserInfo data 400 component is defined as:
Class: UserInfo
Parameters: {string:ID; string:pwd}
Operation: match {ID=UserInfo.id; pwd=UserInfo.password}
Result: true {link to scrSearchParameters} false {link to scrError}

This operation cannot be expressed through cross-component mapping 18 and therefore the tool generates JavaScript function:

```
function validateUser (ID, pwd) {
    var userInfo = UserInfo.find(ID);
    if (userInfo != null) {
        if (userInfo.id == ID && userInfo.password == pwd) {
            scrSearchParameters.display( );
            return;
        }
    }
    scrError.display( );
}
```

Referring again to FIG. 11, the application converter 30 can also have a transformation module 724 for converting the components 400,402,404 (including the components 406) into the schema format defined by the XSD (or DTD) of the application 38, for example to be used in the network 10 associated with the WSDL interface of the data source 106. For the example given above, the Mobile Application Converter 30 uses an XSLT transformation to convert Foundation.Core.Class and Foundation.Core.Association sections of the XMI document (e.g. modeling output 708) back to the format used in the component set 14, in order to produce a resultant application version 725. A further publishing module 726 can be coupled to the transformation module 714 to be validated and published as the completed application 38, which can be uploaded by the application converter 30 to the application repository 114 of the network 10.

Example Operation of the Application Development System 116

Figure 12:
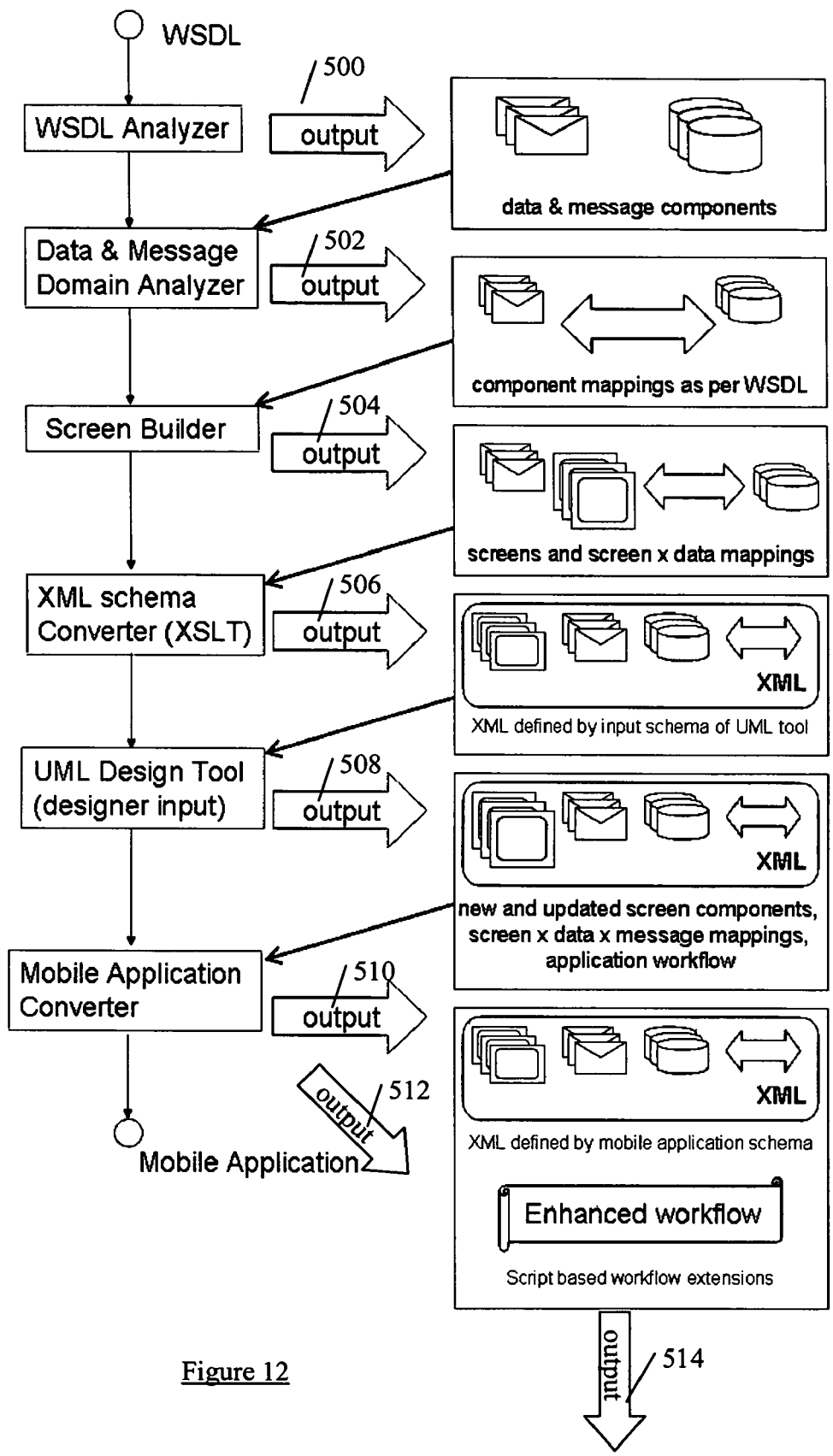
FIG. 12 is an example operation of the application development system of FIG. 2.

Referring to FIGS. 2 and 12, at step 500 the analyzer 12 produces data 400 and message 404 components as component set 14 from the definition document 13. At step 502, the domain analyzer 16 generates data-message mappings 18 according to the component set 14 content. At step 504, the screen builder 20 is used by the developer to generate corresponding presentation components 402 to add to the component set 14, including screen-data and/or screen-message mappings 23 where desired according to the content of the presentation components 402. At step 506 the screen converter 22 converts the component set 14 to the component set 24 according to the output schema of the analyzer 12 and the screen builder 20 and the input schema of the modeling tool 26. at step 508, the developer uses the modeling tool 26 to produce flow and/or relation diagrams as modeling sequences 21 that model the behaviour of component 400,402,404 interaction. The sequences 21 can contain described workflow suitable for representation as mappings 18,23 and/or scripted workflow components 406 (e.g. including a set of scripted instructions describing the interaction between pair of the components—further for example in relation to actions/entities/events external to the device 100). At step 510, the application converter 30 transforms the schema of the generated application components 400,402,404 back to the schema associated with the application 38 for use by the network 10, including any updates/deletions/additions of mappings 18,23 identified in the modeling tool output 708 (see FIG. 10). At step 512 the application converter 30 also selects with of the sequences 21 are to be used to generate scripted workflow components 406. At step 514, the generated components 400, 402,404,406 of the application converter 30 are now validated and/or published as the application 38.

It is recognized in the above given application 38 generation example that the operation of the components 31 can be manual, semi-automatic, or fully automated at various steps depending upon the complexity of interaction required with the developer(s) of the application 38.

We claim:

1. A system for generating a component application including a plurality of components, the component application for facilitating interaction with a schema-defined service by a device over a network, the system comprising:
   a computer processor;
   an analyzer receiving a definition document of a data source, and parsing metadata descriptors of a definition document to identify descriptors of a first set of components;
   a modeling tool producing a modeling sequence and generating a model output; and
   an application converter comprising:
      a workflow extractor identifying the modeling sequence in the modeling output including a model, the model having the first set of components having metadata descriptors expressed in a structured definition language for defining configuration information of the component application, the modeling sequence denoting relations between the first set of components;
      a workflow generator generating a script based workflow component and updating a cross-component mapping based on the identified modeling sequence; and
      a transforming module transforming the first set of components of the model into a first definition format to produce a component set;
   wherein the application converter combines the script based workflow component and the updated component set to generate said component application.

2. The system of claim 1, wherein the first set of components comprises: a data component, a presentation component, and a message component.

3. The system of claim 2, wherein the data component is configured to define data entities used by the component application, the presentation component is configured to define the appearance and behaviour of the component application, and the message component is configured for use by the component application to define messages between other applications on the device or between the component application and the schema-defined service.

4. The system of claim 2, further comprising a mapping analyzer, the mapping analyzer analyzing the message component and the data component, and generating the cross-component mapping.

5. The system of claim 2, further comprising a screen builder generating the presentation component corresponding to manipulation associated with the data component and message component.

6. The system of claim 2, further comprising a schema converter converting a syntax and a format of the data component, the message component and the presentation component, and the cross-component mapping into a format suitable for importing by the modeling tool.

7. The system of claim 1, wherein the modeling tool uses a static diagram, a dynamic diagram, and an implementation diagram.

8. The system of claim 1, wherein the cross-component mapping is a field level mapping or a message level mapping.

9. A method for generating a component application including a plurality of components the component application for facilitating interaction with a schema-defined service by a terminal device over a network, the method comprising:
receiving a definition document of a data source, and parsing metadata descriptors of a definition document to identify descriptors of a first set of components;
producing a modeling sequence and generating a model output;
identifying, in a computer processor, the modeling sequence in the modeling output including a model, the model having the first set of components having metadata descriptors expressed in a structured definition language for defining configuration information of the component application, the modeling sequence denoting relations between the first set of components;
generating a script based workflow component and updating a cross-component mapping based on the identified modeling sequence;
transforming the first set of components of the model into a first definition format to produce a component set; and
combining the script based workflow component and the updated component set to generate said component application.

10. The method of claim 9, wherein the first set of components comprises: a data component, a presentation component and a message component.

11. The method of claim 10, wherein the data component is configured to define data entities used by the component application, the presentation component is configured to define the appearance and behaviour of the component application, and the message component is configured for use by the component application to define messages between other applications on the device or between the component application and the schema-defined service.

12. The method according to claim 10, further comprising analyzing the message component and the data component, and generating the cross-component mapping.

13. The method of claim 10, further comprising generating the presentation component corresponding to manipulation associated with the data component and message component.

14. The method of claim 10, further comprising converting a syntax and a format of the data component, the message component and the presentation component, and the cross-component mapping into a format suitable for importing by the modeling tool.

15. The method of claim 9, further comprising using a static diagram, a dynamic diagram, and an implementation diagram.

16. The method of claim 9, wherein the cross-component mapping is a field level mapping or a message level.

17. A computer readable medium storing instructions or statements for use in the execution in a computer of a method for generating a component application including a plurality of components the component application for facilitating interaction with a schema-defined service by a terminal device over a network, the method comprising:
receiving a definition document of a data source, and parsing metadata descriptors of a definition document to identify descriptors of a first set of components;
producing a modeling sequence and generating a model output;
identifying the modeling sequence in the modeling output including a model, the model having the first set of components having metadata descriptors expressed in a structured definition language for defining configuration information of the component application, the modeling sequence denoting relations between the first set of components;
generating a script based workflow component and updating a cross-component mapping based on the identified modeling sequence;
transforming the first set of components of the model into a first definition format to produce a component set; and
combining the script based workflow component and the updated component set to generate said component.

* * * * *